US012784699B2

(12) United States Patent
Takahata

(10) Patent No.: US 12,784,699 B2
(45) Date of Patent: Nov. 3, 2026

(54) DISPLAY APPARATUS, METHOD FOR CONTROLLING DISPLAY APPARATUS, AND RECORDING MEDIUM FOR ADJUSTING VARIATION RANGE OF LUMINANCE AND/OR SATURATION

(71) Applicant: SHARP KABUSHIKI KAISHA, Osaka (JP)

(72) Inventor: Motoki Takahata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 19/235,680

(22) Filed: Jun. 12, 2025

(65) Prior Publication Data

US 2025/0391383 A1 Dec. 25, 2025

(30) Foreign Application Priority Data

Jun. 19, 2024 (JP) ................................ 2024-098970
Apr. 11, 2025 (JP) ................................ 2025-065816

(51) Int. Cl.
*G09G 3/34* (2006.01)

(52) U.S. Cl.
CPC ... *G09G 3/3406* (2013.01); *G09G 2320/0233* (2013.01); *G09G 2320/0242* (2013.01); *G09G 2320/0626* (2013.01); *G09G 2320/0666* (2013.01); *G09G 2320/0693* (2013.01)

(58) Field of Classification Search
CPC ......... G09G 3/3406; G09G 2320/0233; G09G 2320/0242; G09G 2320/0626; G09G 2320/0666; G09G 2320/0693
See application file for complete search history.

(56) References Cited

U.S. PATENT DOCUMENTS

2010/0188325 A1* 7/2010 Inoue .................. G09G 3/3406 345/207
2016/0171955 A1* 6/2016 Yata .................... G09G 3/3607 345/601
2017/0323618 A1* 11/2017 Takanashi ............ G09G 3/3208
2018/0012561 A1* 1/2018 Yoon ........................ G09G 5/10

FOREIGN PATENT DOCUMENTS

WO 2015/107880 A1 7/2015

* cited by examiner

*Primary Examiner* — Kwang-Su Yang
(74) *Attorney, Agent, or Firm* — ScienBiziP, P.C.

(57) ABSTRACT

A display apparatus includes: a display; an acquirer that acquires external factors; and a controller that displays, in response to a signal inputted, a video on the display by restricting a variation range of luminance or saturation of the video based on the external factors acquired.

15 Claims, 19 Drawing Sheets

FIG. 5A

| SETTING ITEM | SETTING VALUE |
|---|---|
| ⋮ | ⋮ |
| BACKLIGHT LUMINANCE | 80% |
| SOUND VOLUME | 36 |
| ⋮ | ⋮ |
| SUPPRESSION SETTING | ON |
| ⋮ | ⋮ |

FIG. 5B

| SUPPRESSION EFFECT | VARIATION RANGE SCALING FACTOR |
|---|---|
| ⋮ | ⋮ |
| 1 | 0.9 |
| ⋮ | ⋮ |
| 3 | 0.7 |
| ⋮ | ⋮ |

| SUPPRESSION EFFECT | ILLUMINANCE SETTING VALUE |
|---|---|
| ⋮ | ⋮ |
| 1 | 0 |
| ⋮ | ⋮ |
| 3 | 100 |
| ⋮ | ⋮ |

| SUPPRESSION EFFECT | GENRE INFORMATION |
|---|---|
| ⋮ | ⋮ |
| 3 | ANIMATION, SPECIAL EFFECTS, LIVE CONCERTS/ CONCERTS, |
| 2 | SPORTS, THEATER, LIVE PERFORMANCES, WESTERN MOVIES, JAPANESE MOVIES, |
| ⋮ | ⋮ |
| 1 | NEWS, WELFARE, INTERVIEWS/DISCUSSIONS, |
| ⋮ | ⋮ |

DISPLAY APPARATUS, METHOD FOR CONTROLLING DISPLAY APPARATUS, AND RECORDING MEDIUM FOR ADJUSTING VARIATION RANGE OF LUMINANCE AND/OR SATURATION

BACKGROUND OF THE DISCLOSURE

Field of the Disclosure

The present disclosure relates to a display apparatus and the like.

Description of the Background Art

An image processing apparatus known as a conventional technology, for example, is capable of generating a video with suppressed variations in luminance or saturation for a video that may trigger photosensitive seizures.

An object of the present disclosure is to provide, for example, a display apparatus and the like that allows a user to view a video in an optimal condition regardless of brightness.

SUMMARY OF THE DISCLOSURE

A display apparatus according to an aspect of the present disclosure includes: a display; an acquirer that acquires external factors; and a controller that displays, in response to a signal inputted, a video on the display by restricting a variation range of luminance or saturation of the video based on the external factors acquired.

A method for controlling a display apparatus according to another aspect of the present disclosure includes: displaying; acquiring external factors; and performing a control to display, in response to a signal inputted, a video by restricting a variation range of luminance or saturation of the video in the displaying based on the external factors acquired.

A recording medium recording thereon a program, according to another aspect of the present disclosure, causes a computer to execute processing including: displaying; acquiring external factors; and performing a control to display, in response to a signal inputted, a video by restricting a variation range of luminance or saturation of the video in the displaying based on the external factors acquired.

According to the present disclosure, it is possible to provide, for example, a display apparatus and the like that allows a user to view a video in an optimal condition regardless of brightness.

BRIEF DESCRIPTION OF THE DRAWINGS

FIG. 5A is a diagram for describing an example of system setting information according to the first embodiment.

FIG. 5B is a diagram for describing an example of variation range information according to the first embodiment.

DESCRIPTION OF THE PREFERRED EMBODIMENTS

A generally known display apparatus is capable of displaying broadcast programs received via broadcast signals, moving images recorded on recording media, moving images delivered via video distribution sites, and other content in the form of video.

Some videos displayed by such a display apparatus, for example, have harmful effects on well-being of users viewing the videos. For example, when viewing videos with significant variations in luminance or saturation, such as videos with rapid flashing or extreme changes in color intensity, some users may experience adverse physical reactions such as dizziness, seizures, or impaired consciousness.

In this regard, for example, a method is known in which a display apparatus generates a video with suppressed variations in saturation to prevent adverse physical reactions. However, the frequency with which adverse physical reactions, such as photosensitive seizures, are induced is influenced not only by the variation range of the luminance or the saturation of the video but also by external factors, such as surrounding brightness and the distance between the display apparatus and the user viewing the video. If the display apparatus performs processing based solely on information pertaining to an inputted video, therefore, the display apparatus may fail to prevent adverse physical reactions from being triggered due to external factors in addition to the video or may end up generating a video with undesirable image quality due to excessive image processing.

The following describes embodiments of a display apparatus that solves the problems described above, with reference to the accompanying drawings. It should be noted that the following embodiments are merely examples of the disclosure described in the claims, and the technical scope of the present disclosure is not limited to the description of the following embodiments.

1. First Embodiment

The following describes a first embodiment. It should be noted that the first embodiment is described using an example given below. The description of the following embodiment is directed to a display apparatus according to the present disclosure.

1.1. Overall Configuration

Figure 1:
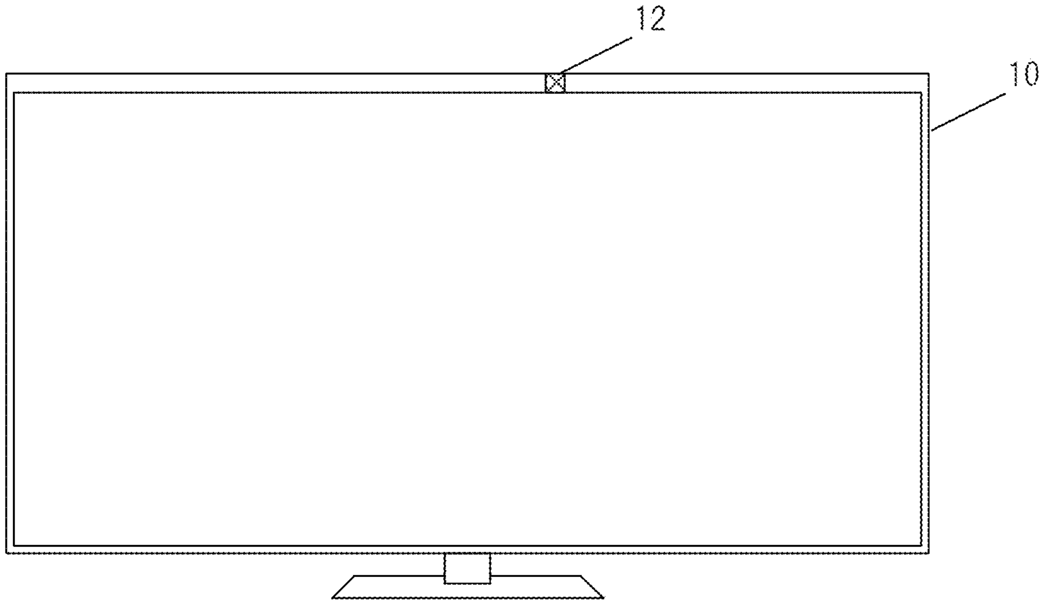
FIG. 1 is a diagram illustrating an overview of a display apparatus according to a first embodiment.

FIG. 1 is a diagram illustrating an overview of a display apparatus 10. The display apparatus 10 is capable of displaying content. For example, the display apparatus 10 may be a television capable of displaying broadcast programs by receiving broadcast signals, or may be a monitor capable of displaying moving image content from, for example, a video distribution site by connecting to a network (NW). Alternatively, the display apparatus 10 may be a projector that projects a display screen image onto a screen.

Note here that the content may be anything that can be displayed by the display apparatus 10. For example, the content may be: a broadcast program that is displayed by receiving and demodulating terrestrial broadcast signals, broadcast satellite (BS) signals, or communications satellite (CS) signals; a moving image selected by the user on a video distribution site; or a video that is inputted from an external source via High-Definition Multimedia Interface (HDMI) (registered trademark), Universal Serial Bus (USB), or the like.

The network (NW) to which the display apparatus 10 connects may be any kind of communication line or communication system. Examples of usable communication systems include, wired or wireless, a local area network (LAN), a virtual local area network (VLAN), the Internet, a public network, and a mobile communication (for example, 4G/5G/6G mobile communication), and a next-generation telephone network.

The display apparatus 10 has a device that acquires external factors in an environment where the display apparatus 10 is installed. In the present embodiment, the external factors include conditions surrounding the display apparatus 10 and/or the user viewing the content. For example, the external factors include the distance between the user and the display apparatus 10. The external factors may also include, for example, the brightness of the user's viewing environment.

The external factors as used herein refer to factors that affect the user's viewing of the content among the conditions surrounding the display apparatus 10 and/or the user. Examples of such external factors include the distance between the user and the display apparatus 10, the brightness of the user's viewing environment, and the color temperature of lighting in the user's viewing environment.

It should be noted that the display apparatus 10 has, for example, a camera 12 as a device that acquires external factors. The display apparatus 10 may include one or more cameras 12. Instead of the camera 12, the display apparatus 10 may have, for example, a human presence sensor, a depth sensor, a distance sensor, and an illuminance sensor.

1.2. Hardware Configuration

Figure 2:
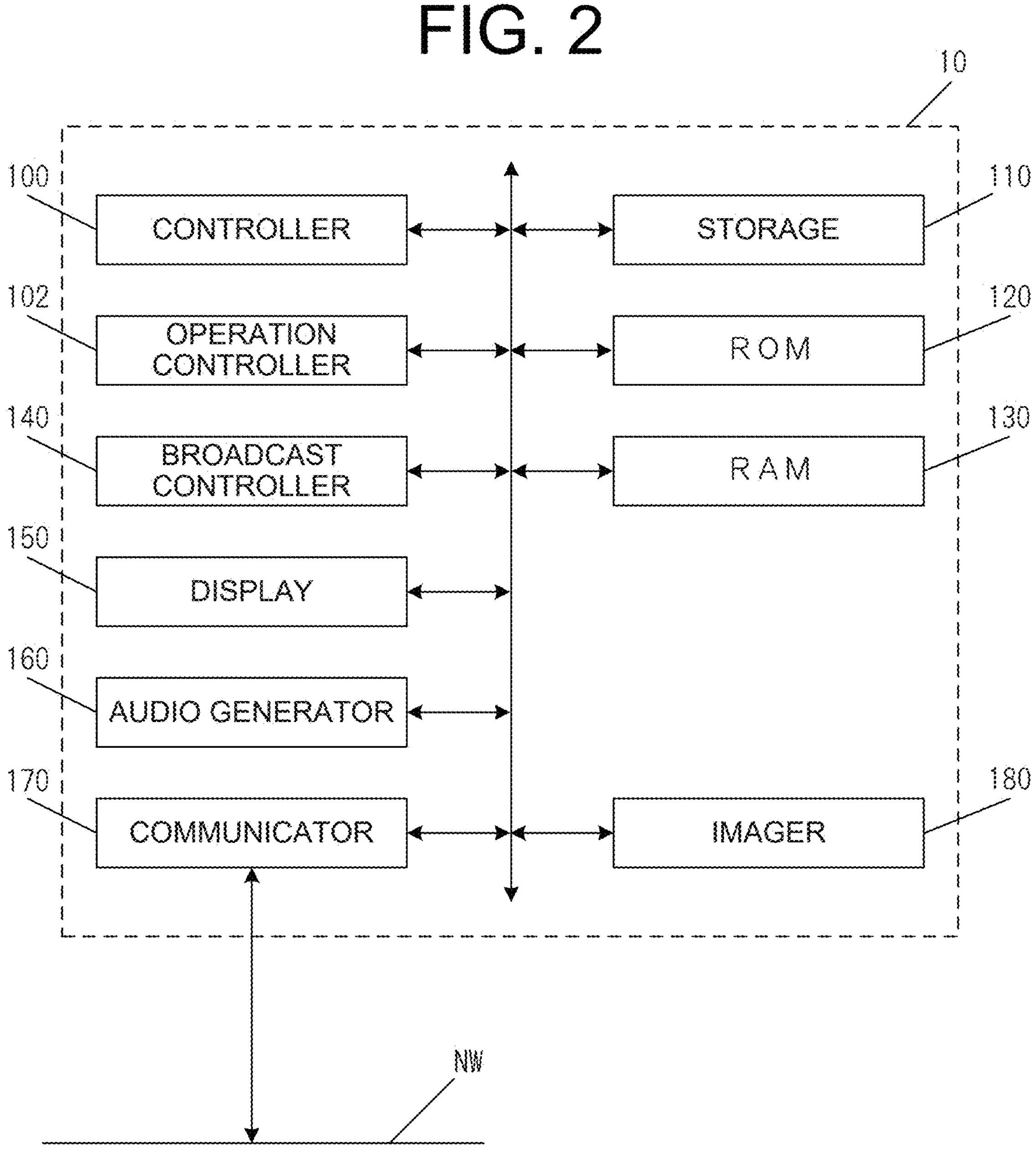
FIG. 2 is a diagram illustrating a hardware configuration of the display apparatus according to the first embodiment.

The following describes a hardware configuration with reference to FIG. 2. FIG. 2 is a diagram illustrating an example of the display apparatus 10.

The display apparatus 10 includes a controller 100, a storage 110, read only memory (ROM) 120, random access memory (RAM) 130, an operation controller 102, a broadcast controller 140, a display 150, an audio generator 160, a communicator 170, and an imager 180. The storage 110, the ROM 120, and the RAM 130 are collectively referred to as a storage (storage device).

The controller 100 performs overall control of the display apparatus 10. The controller 100 reads and executes various programs stored in the storage (for example, the storage 110, the ROM 120, or the RAM 130), and thus implements various functions. The controller 100 may be implemented by one or more control devices/arithmetic devices (central processing units (CPUs) or Systems on Chip (SoCs)). The controller 100 may include one or more control circuits.

The operation controller 102 receives operations from the user and gives operation instructions to other functional units. The operation controller 102 may, for example, notify the user of an operation signal corresponding to an operation received by the controller 100. The operation controller 102 may be, for example, an operation signal receiver that receives operations from a remote controller or an operation switch provided on the display apparatus 10.

The storage 110 is a nonvolatile storage device capable of storing programs and data. The storage 110 may include, for example, one or more storage devices such as an HDD or an SSD. The storage 110 may be configured as an external device such as a USB flash drive or a portable HDD that can be connected to the display apparatus 10. Alternatively, the storage 110 may be, for example, a storage area in the cloud.

The ROM 120 is nonvolatile memory that can retain programs and data even when the power is turned off.

The RAM 130 is main memory that is used mainly by the controller 100 when executing processing. The RAM 130 is rewritable memory that temporarily holds a program read from the storage 110 or the ROM 120, as well as data including execution results.

The broadcast controller 140 receives broadcast signals transmitted by a broadcaster selected by the user, decodes video data from the broadcast signals, and outputs video signals to the display 150. The broadcast controller 140 also decodes audio data from the broadcast signals and outputs audio signals to the audio generator 160. The broadcast controller 140 may include, for example, a digital tuner (for example, terrestrial/BS/CS), an orthogonal frequency-division multiplexing (OFDM) demodulator, a separator (for example, demultiplexer (DEMUX)), and a Moving Picture Experts Group phase 2 (MPEG2) decoder.

The display 150 can display a video contained in content. Furthermore, the display 150 can display various types of information and various screens, such as an execution screen. The display 150 may be, for example, a device capable of displaying videos, such as a liquid crystal display (LCD), an organic electro luminescence (EL) display, or an electrophoretic display.

The display 150 also includes an interface that allows for connection of the display apparatus 10. For example, an external display apparatus may be connected to the display apparatus 10 via an HDMI, a digital visual interface (DVI), or a display port. The display 150 may be, for example, a projection device, such as a projector.

The audio generator 160 outputs audio contained in the content. The audio generator 160 may include, for example, devices such as an amplifier, speakers, and headphones. In addition to the audio contained in the content, the audio generator 160 can output, for example, general sounds such as music, environmental sounds, and notification sounds.

The communicator 170 is a communication interface that enables communication with other devices. For example, the communicator 170 may be a network interface capable of providing wired or wireless connectivity. In the present embodiment, the communicator 170 enables communication with other devices via the network (NW).

The imager 180 is an imaging device that captures an image of the surroundings of an area where the display apparatus 10 is installed. In the present embodiment, for example, the imager 180 is the camera 12. The imager 180 may include one or more imaging devices. The imager 180 outputs the captured image as image data. The imager 180 may output one or more images as a video data stream. The imager 180 may be, for example, an environment acquirer having a plurality of sensors.

Broadcast Controller

Figure 3:
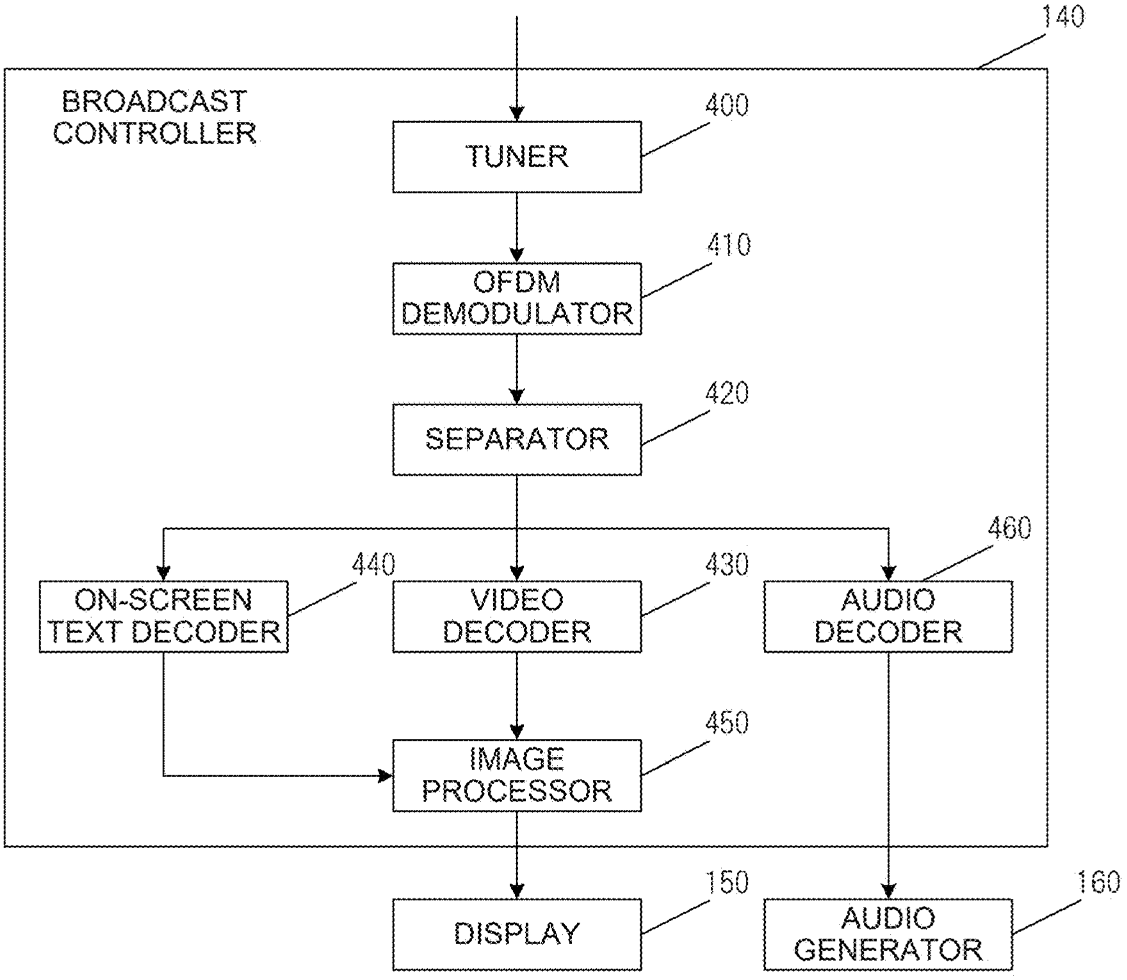
FIG. 3 is a diagram illustrating a configuration of a broadcast controller according to the first embodiment.

The following describes a configuration of the broadcast controller 140 in a simplified manner with reference to FIG. 3. The broadcast controller 140 includes a tuner 400, an OFDM demodulator 410, a separator 420, a video decoder 430, an on-screen text decoder 440, an image processor 450, and an audio decoder 460.

The tuner 400 acquires, for example, a terrestrial, BS, CS, or other type of digital broadcast signal received from an antenna or the like, and outputs the broadcast signal to the OFDM demodulator 410.

The OFDM demodulator 410 demodulates, for example, the broadcast signal inputted from the tuner 400 using a fast Fourier transform, and outputs content data, for example, transport stream (TS) packets, after error correction and the like has been performed. The OFDM demodulator 410 outputs the TS packets to the separator 420.

The separator 420 separates the TS packets inputted from the OFDM demodulator 410. The separator 420 outputs, for example, the separated TS packets to the video decoder 430 if the separated TS packets contain video data, and outputs the separated TS packets to the audio decoder 460 if the separated TS packets contain audio data. The separator 420 also outputs TS packets containing on-screen text-related data to the on-screen text decoder 440.

The video decoder 430 decodes video data from the TS packets containing video data inputted from the separator 420 and outputs a video signal to the image processor 450. Likewise, the on-screen text decoder 440 decodes on-screen text-related data from the TS packets containing on-screen text-related data inputted from the separator 420 and outputs on-screen text information to the image processor 450.

The image processor 450 outputs, to the display 150, a video signal obtained by superimposing the on-screen text information inputted from the on-screen text decoder 440 on the video signal inputted from the video decoder 430 as necessary.

The audio decoder 460 decodes audio data from the TS packets containing audio data inputted from the separator 420 and outputs an audio signal to the audio generator 160.

It should be noted that FIG. 3 is a schematic diagram illustrating a general broadcast controller 140, and the broadcast controller 140 may have other configurations. For example, the broadcast controller 140 may include a broadcast program information decoder that decodes and acquires broadcast program information, for example, electronic broadcast program guide (EPG) data, from TS packets.

1.3. Software Configuration

Figure 4:
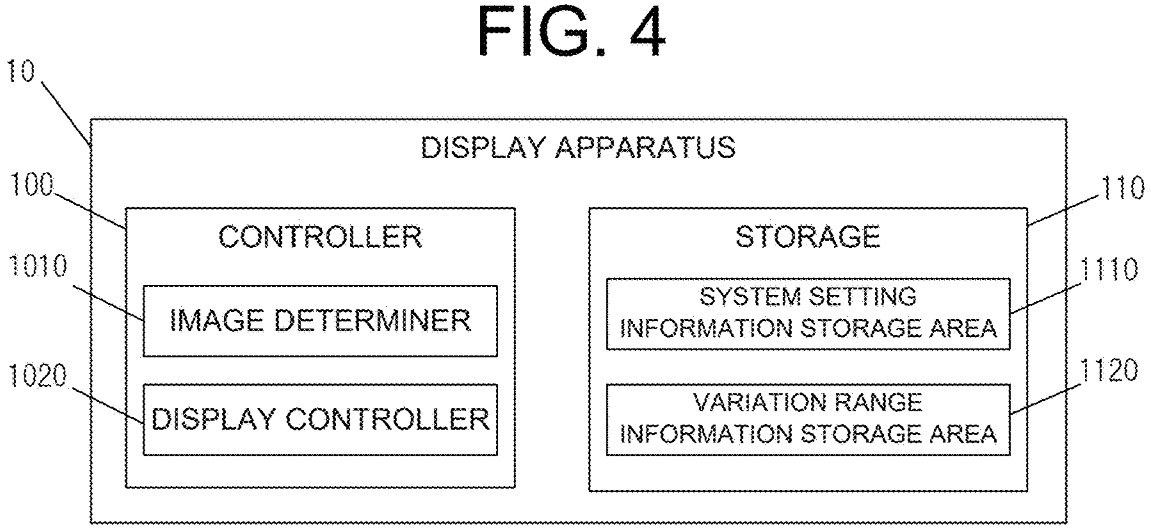
FIG. 4 is a diagram illustrating a software configuration of the display apparatus according to the first embodiment.

The following describes a software configuration with reference to FIG. 4. It should be noted that FIG. 4 shows main elements of the software configuration that are necessary for the present embodiment, and other elements of the software configuration are not shown.

The controller 100 can implement an image determiner 1010 and a display controller 1020 by reading and executing a program stored in the storage (the storage 110 or the ROM 120).

The image determiner 1010 determines, for example, the illuminance and the viewing distance based on image data acquired from the imager 180. The illuminance that is determined by the image determiner 1010 refers to, for example, the surrounding illuminance of the display apparatus 10. The image determiner 1010 determines, for example, the illuminance based on the luminance of the image data.

The viewing distance refers to, for example, the distance from the display apparatus 10 to the user viewing the content (for example, video). The image determiner 1010 determines the viewing distance based on the user's position and an image (for example, floor) that serves as an indicator in the acquired image data. Alternatively, the image determiner 1010 may determine the viewing distance based on the user's physical characteristics (height, face size, body shape, and the like) in the image. Other than those above, the image determiner 1010 can determine the viewing distance by using any of known methods.

The display controller 1020 controls, for example, the luminance and/or the saturation of a video or an image that is displayed on the display 150. The display controller 1020 can, for example, change the backlight luminance, and control the luminance or the saturation (for example, a color difference signal or a luminance signal) of the video using color spaces such as YCbCr, YPbPr, and RGB. The display controller 1020 may combine, for example, the control of the backlight luminance with the control of the luminance or the saturation using color spaces. Furthermore, the display controller 1020 may set the luminance or the saturation using, for example, a look up table (LUT). Other than those above, the display controller 1020 can control the luminance and/or the saturation of the video by using any of known methods.

In the storage 110, a system setting information storage area 1110 for storing system setting information is reserved. The system setting information refers to, for example, information related to settings necessary for the operation of the display apparatus 10. FIG. 5A is a diagram showing an example of the system setting information stored in the system setting information storage area 1110. The system setting information contains setting items (for example, "backlight luminance") and setting values (for example, "80%") for the display apparatus 10. The system setting information may also contain other information such as sound volume, suppression setting, and channel to be viewed.

In the storage 110, a variation range information storage area 1120 for storing variation range information is also reserved. The variation range information refers to, for example, information to be used by the display apparatus 10 to set the variation range of the luminance or the saturation of the video that is outputted to the display 150 of the display apparatus 10. FIG. 5B is a diagram showing an example of the variation range information stored in the variation range information storage area 1120. The variation range information contains levels of suppression effect (for example, "1") and variation range scaling factors (for example, "0.9").

The variation range as used herein refers to, for example, the amplitude of temporal changes in the luminance or saturation value. The suppression effect refers to the degree to which the variation range is restricted. For example, a plurality of levels may be set for the suppression effect. The display apparatus 10 may display, for example, a video by decreasing the variation range of the luminance or the saturation as the level of the suppression effect increases (as the suppression effect is strengthened) and increasing the variation range of the luminance or the saturation as the level of the suppression effect decreases (as the suppression effect is reduced). The variation range scaling factor represents a ratio that is used to restrict (suppress) the luminance or saturation value. The variation range scaling factor may be, for example, stored as a luminance or saturation gain, either as a decimal value equal to or less than 1, or in decibels (dB).

1.4. Flow of Processing

Figure 6:
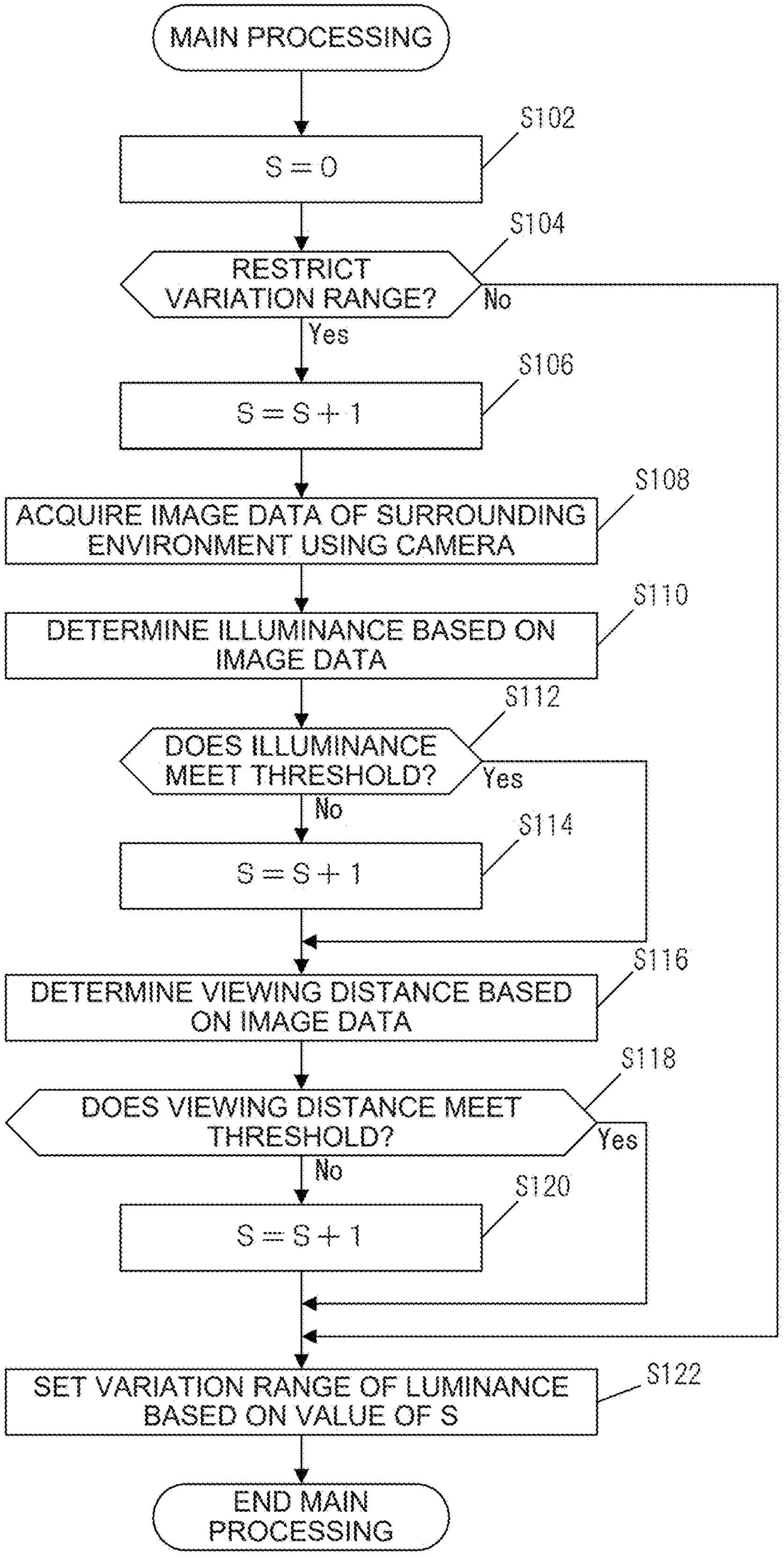
FIG. 6 is a diagram for describing a flow of processing according to the first embodiment.

The following describes a flow of processing according to the present embodiment with reference to FIG. 6. It should be noted that each of elements of configuration described with reference to FIG. 2 or FIG. 4 may perform a process in corresponding one of steps.

First, the controller 100 sets the level of the suppression effect to zero suppression (S=0) (S102). Next, the controller 100 determines, based on the system setting information, whether or not to restrict the variation range (S104). Upon determining to restrict the variation range, the controller 100 increases the level of the suppression effect by one level (Yes in S104→S106).

Next, the controller 100 acquires from the imager 180, for example, image data of the surrounding environment as an external factor using the camera of the imager 180 (S108). Subsequently, the controller 100 determines the illuminance based on the acquired image data using the image determiner 1010 (S110). Next, the controller 100 determines whether or not the determined illuminance meets a threshold (S112).

For example, the controller 100 determines that the illuminance meets the threshold if the determined illuminance is greater than the threshold. The threshold for the illuminance may be, for example, an illuminance of 200 Lx, preferably 100 Lx, and more preferably 50 Lx. Upon determining that the determined illuminance does not meet the threshold, the controller 100 increases the level of the suppression effect by one level (No in S112→S114).

Upon determining that the determined illuminance meets the threshold, the controller 100 determines the viewing distance based on the acquired image data using the image determiner 1010 (Yes in S112→S116). Next, the controller 100 determines whether or not the determined viewing distance meets a threshold (S118).

For example, the controller 100 determines that the determined viewing distance meets the threshold if the determined viewing distance is greater than the threshold. The threshold for the viewing distance may be, for example, set based on a height H of the display 150 of the display apparatus 10. For example, the threshold for the viewing distance may be twice the height H. Upon determining that the determined viewing distance does not meet the threshold, the controller 100 increases the level of the suppression effect by one level (No in S118→S120).

Next, the controller 100 applies a variation range scaling factor corresponding to the level of the suppression effect based on the variation range information and sets the variation range of the luminance of the video using the display controller 1020 (S122). It should be noted that the controller 100 also executes the process in S122 upon determining that the determined viewing distance meets the threshold (Yes in S112) and upon determining not to restrict the variation range (No in S104).

1.5. Operation Example

FIGS. 7A to 7D are each a diagram schematically illustrating variations in luminance of a video displayed on the display apparatus 10 according to the present embodiment. FIGS. 8A to 8D are each a diagram schematically illustrating conditions surrounding users of the display apparatus 10 or results of operation based on the conditions surrounding each user.

Figure 7A:
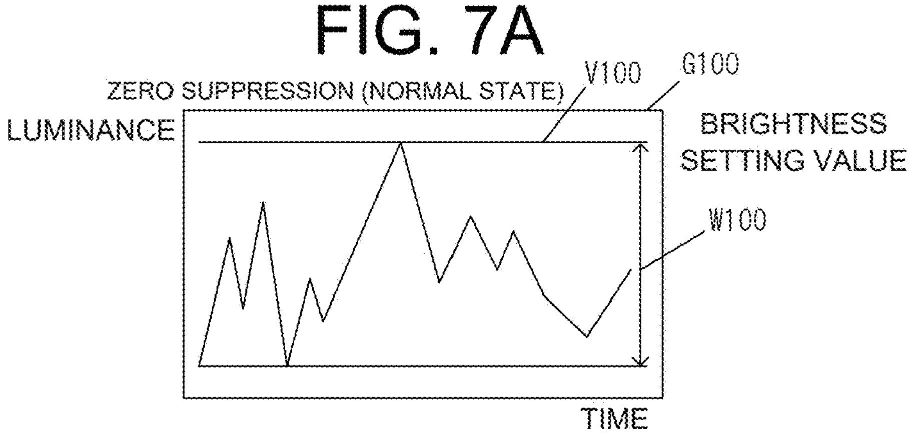
FIGS. 7A to 7D are each a diagram illustrating an operation example according to the first embodiment.

FIG. 7A is a diagram showing a graph G100 of variations in luminance in a case where the level of the suppression effect is set to zero suppression, showing temporal changes in luminance with luminance on the vertical axis and time on the horizontal axis. The controller 100 sets, for example, a brightness setting value V100 such as the backlight luminance. The controller 100 outputs the video by varying the luminance of the video within a variation range W100 having the brightness setting value V100 as its maximum value.

Figure 7B:
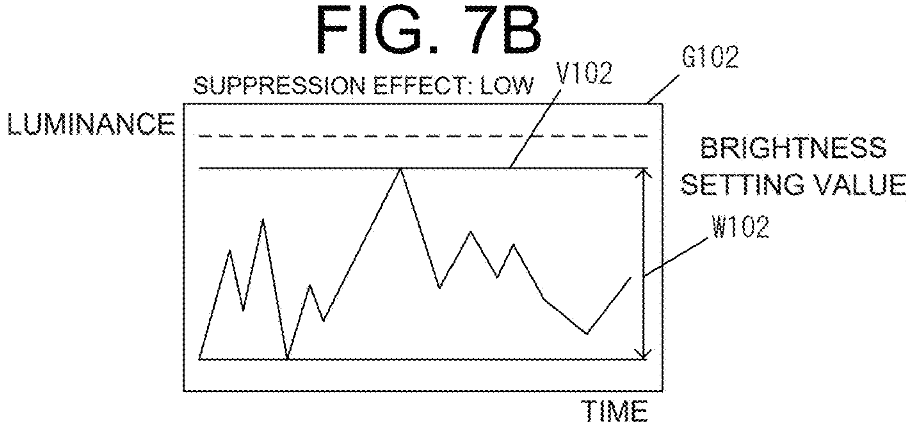

FIG. 7B is a diagram showing a graph G102 of variations in luminance in a case of a low suppression effect where the level of the suppression effect has been increased by one level from that in FIG. 7A. The controller 100 sets, for example, a brightness setting value V102 to a lower value than the brightness setting value V100 in FIG. 7A based on the ratio of the variation range scaling factor. The controller 100 outputs the video by varying the luminance of the video within a variation range W102 having the brightness setting value V102 as its maximum value (for example, displays the video by restricting the backlight luminance).

Figure 7C:
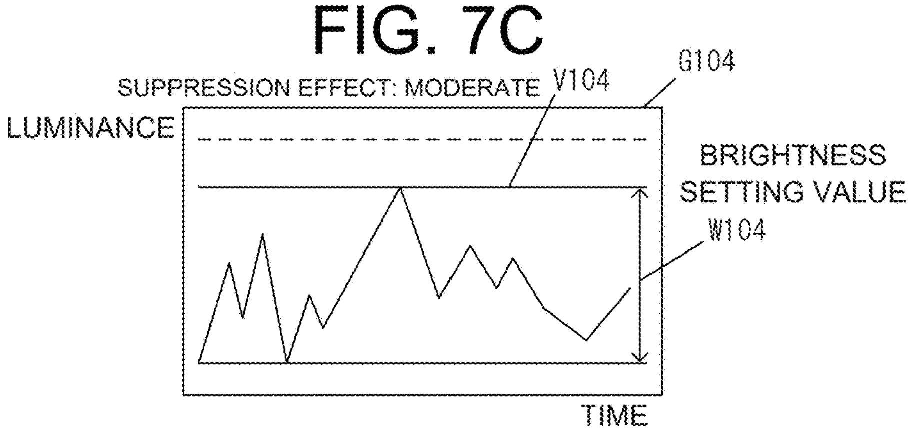

FIG. 7C is a diagram showing a graph G104 of variations in luminance in a case of a medium (moderate) suppression effect, which is between the low suppression effect and a high suppression effect, where the level of the suppression effect has been increased by one level from that in FIG. 7B. The controller 100 sets, for example, a brightness setting value V104 to a lower value than the brightness setting value V102 in FIG. 7B based on the ratio of the variation range scaling factor. The controller 100 outputs the video by varying the luminance of the video within a variation range W104 having the brightness setting value V104 as its maximum value.

Figure 7D:
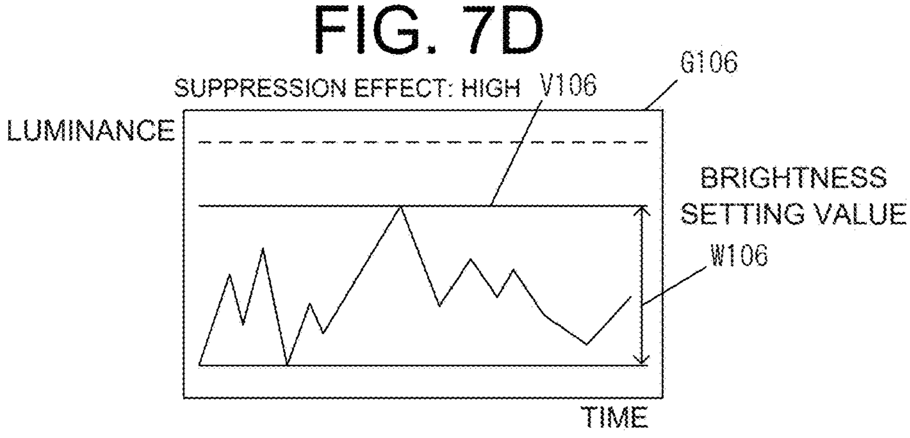

FIG. 7D is a diagram showing a graph G106 of variations in luminance in a case of the high suppression effect where the level of the suppression effect has been increased by one level from that in FIG. 7C. The controller 100 sets, for example, a brightness setting value V106 to a lower value than the brightness setting value V104 in FIG. 7C based on the ratio of the variation range scaling factor. The controller 100 outputs the video by varying the luminance of the video within a variation range W106 having the brightness setting value V106 as its maximum value, restricting the variation range of the luminance to the maximum extent.

Figure 8A:
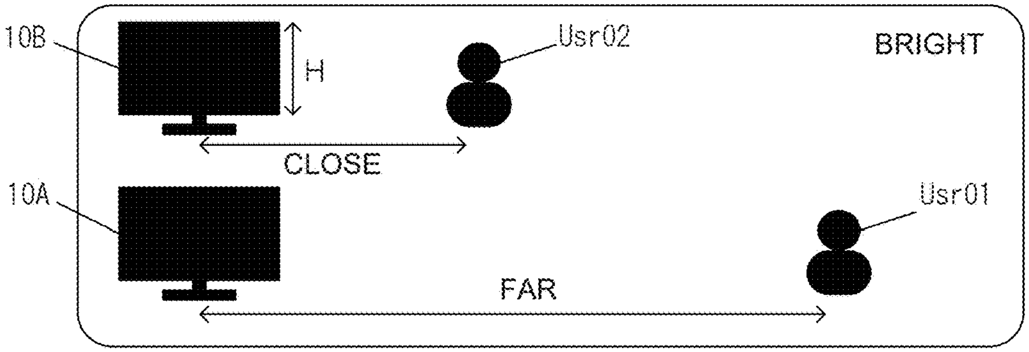
FIGS. 8A to 8D are each a diagram illustrating an operation example according to the first embodiment.
Figure 8B:
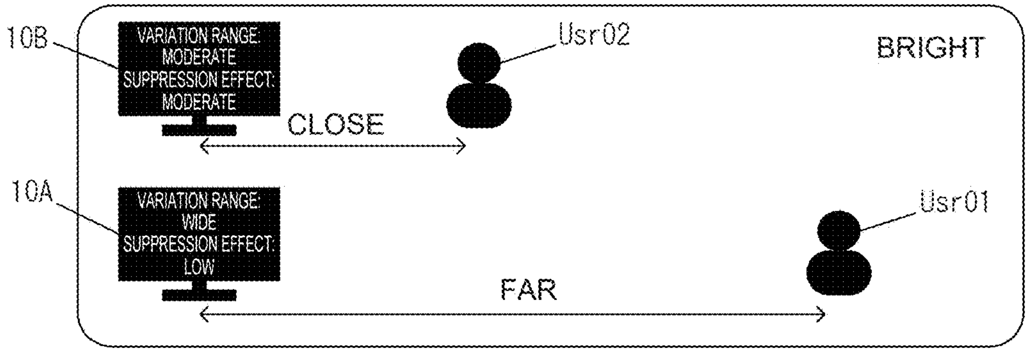
Figure 8C:
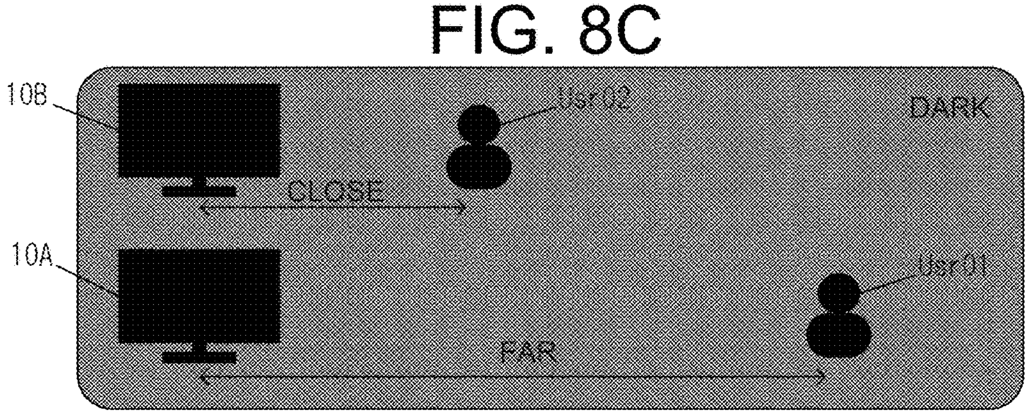

FIGS. 8A and 8C are each a diagram showing conditions surrounding users viewing videos displayed on display apparatuses 10. In FIG. 8A, users are viewing videos in a bright environment (for example, an illuminance of 250 Lx). A user Usr01 is viewing a video at a position far from a display apparatus 10A (for example, the viewing distance is three times the height H of the display apparatus 10A). A user Usr02 is viewing a video at a position close to a display apparatus 10B (for example, the viewing distance is the same as the height H of the display apparatus 10B). In the present embodiment, the threshold for the viewing distance is set to twice the height H, and the threshold for the illuminance is set to 200 Lx.

FIG. 8B is a diagram schematically illustrating results of the display apparatus 10A and the display apparatus 10B applying the processing shown in FIG. 6 based on the conditions surrounding each user shown in FIG. 8A. The display apparatus 10A shown in FIG. 8B determines that the user Usr01 is at a position far from the display apparatus 10A (the viewing distance meets the threshold) and that the user Usr01 is in a bright environment (the illuminance meets the threshold). The display apparatus 10A sets the suppression effect to a low level and sets a wide variation range for the luminance as shown in FIG. 7B, for example. The display apparatus 10B shown in FIG. 8B determines that the user Usr02 is at a position close to the display apparatus 10B (the viewing distance does not meet the threshold) and that the user Usr02 is in a bright environment. The display apparatus 10B sets the suppression effect to a moderate level and sets a moderate variation range for the luminance as shown in FIG. 7C, for example.

In FIG. 8C, the users are viewing videos in a dark environment (for example, an illuminance of 30 Lx). The user Usr01 is viewing a video at a position far from the display apparatus 10A. The user Usr02 is viewing a video at a position close to the display apparatus 10B.

Figure 8D:
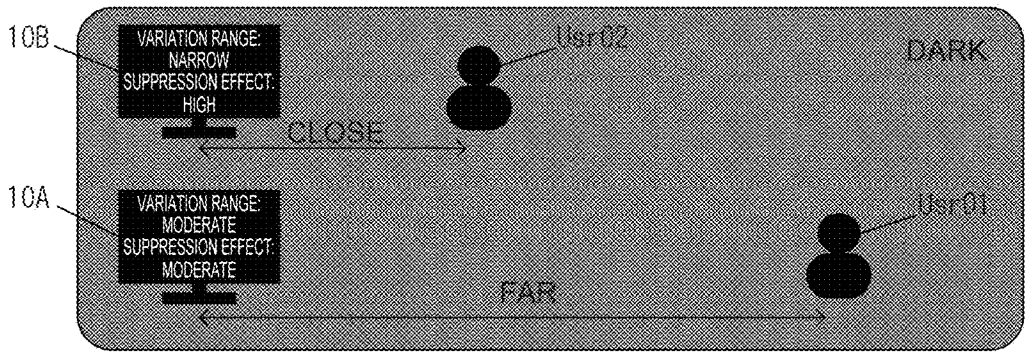

FIG. 8D is a diagram showing results of the operation of the display apparatus 10A and the display apparatus 10B based on the conditions surrounding each user shown in FIG. 8C. The display apparatus 10A shown in FIG. 8D determines that the user Usr01 is at a position far from the display apparatus 10A and that the user Usr01 is in a dark environment (the illuminance does not meet the threshold). The display apparatus 10A sets the suppression effect to a moderate level and sets a moderate variation range for the luminance as shown in FIG. 7C, for example. The display apparatus 10B shown in FIG. 8D determines that the user Usr02 is at a position close to the display apparatus 10B and that the user Usr02 is in a dark environment. The display apparatus 10B sets the suppression effect to a high level and sets a narrow variation range for the luminance as shown in FIG. 7D, for example.

As described above, in response to externally inputted signals such as broadcast programs, Video On Demand (VOD), or other content, the display apparatus according to the present embodiment can display a video by restricting the variation range of the luminance based on external factors.

In the present embodiment, the controller 100 sets the variation range of the luminance of the video. However, for example, the controller 100 may set the variation range of the saturation of the video according to the variation range scaling factor. Furthermore, the controller 100 may set the variation ranges of the luminance and the saturation of the video.

The present embodiment has been described using an example in which only one threshold is defined for the illuminance and only one threshold is defined for the viewing distance. However, for example, the controller 100 may use a plurality of thresholds for the illuminance and a plurality of thresholds for the viewing distance for the determination. Alternatively, the user may set the thresholds for the viewing distance and the illuminance as appropriate.

1.6. Advantageous Effects

As described above, the controller 100 can restrict the variation range of the luminance of content (for example, video) that is displayed on the display 150 based on the illuminance and the viewing distance. This allows users (viewers) to enjoy better quality content (videos) in their favorite viewing environment without worrying about adverse physical reactions.

Furthermore, the controller 100 measures external factors (for example, surrounding brightness, distance of the viewer to the screen) and restricts the variation range of the luminance (increases the suppression effect) when the distance is short or when the environment is dark more than when the distance is long or when the environment is bright, making it possible to inhibit adverse physical reactions (for example, induction of photosensitive seizures) while preventing excessive image processing.

2. Second Embodiment

The following describes a second embodiment. According to the second embodiment, in a case where a plurality of users are viewing content displayed on a single display apparatus 10, the controller 100 restricts the variation ranges of the luminance and the saturation of the video based on the viewing distance of a viewer closest to the display apparatus 10.

Description of elements of the second embodiment that have the same hardware or software configuration as those of the first embodiment will be omitted, and thus description of the second embodiment will focus on differences from the first embodiment.

2.1. Flow of Processing

Figure 9:
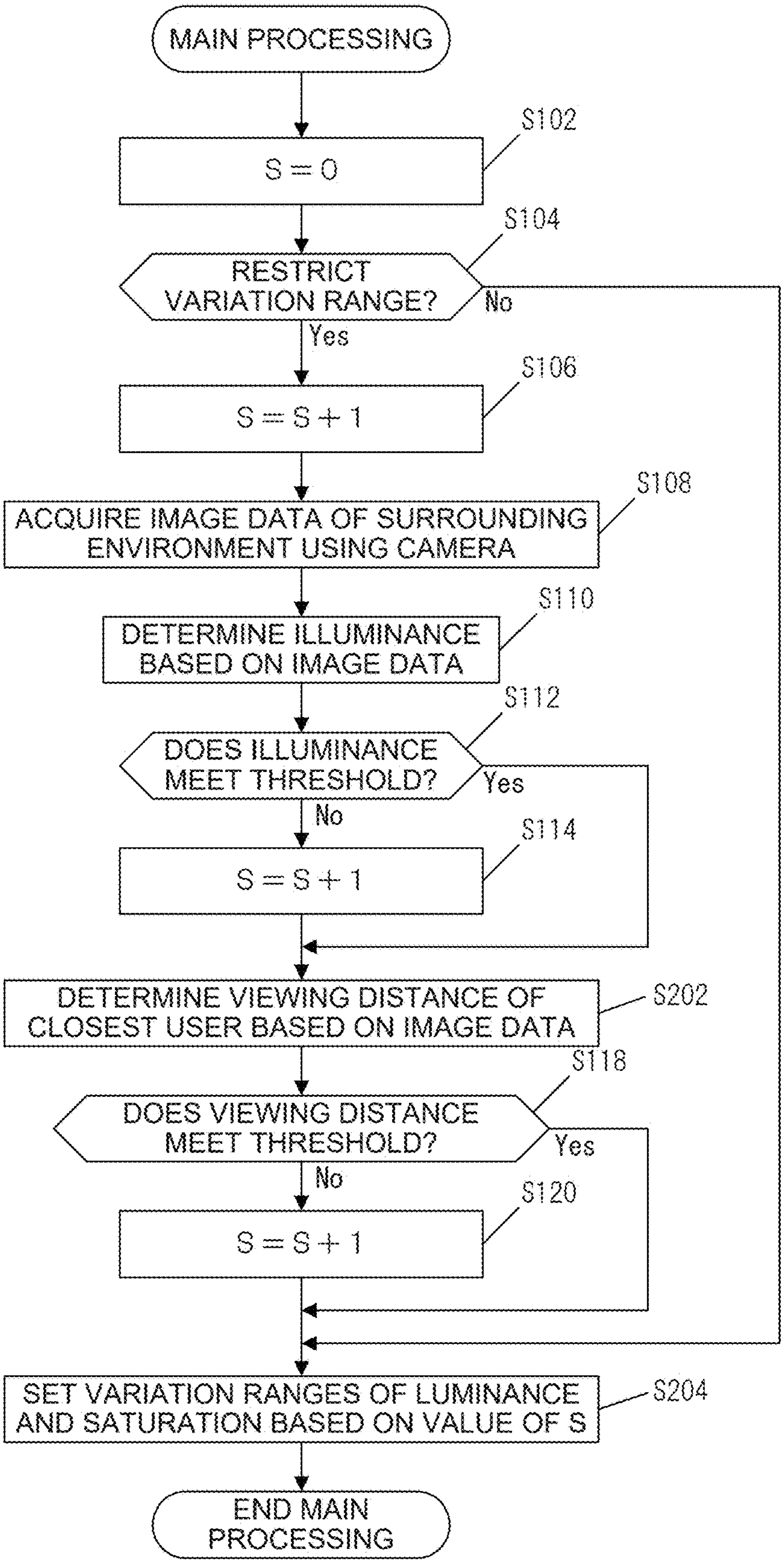
FIG. 9 is a diagram for describing a flow of processing according to a second embodiment.

FIG. 9 is a diagram for describing a flow of processing according to the present embodiment. FIG. 9 replaces FIG. 6 of the first embodiment. S202 and S204 are executed instead of S116 and S122, respectively, shown in FIG. 6.

The controller 100 determines the viewing distance of a user closest to the display apparatus 10 based on the acquired image data using the image determiner 1010 (S202).

Next, the controller 100 applies a variation range scaling factor corresponding to the level of the suppression effect and sets the variation ranges of the luminance and the saturation (S204).

2.2. Operation Example

FIGS. 10A to 10D are each a diagram schematically illustrating variations in saturation of a video displayed on the display apparatus 10 according to the present embodiment. FIGS. 11A to 11D are each a diagram schematically illustrating conditions surrounding users of the display apparatus 10 or results of operation based on the conditions surrounding each user.

Figure 10A:
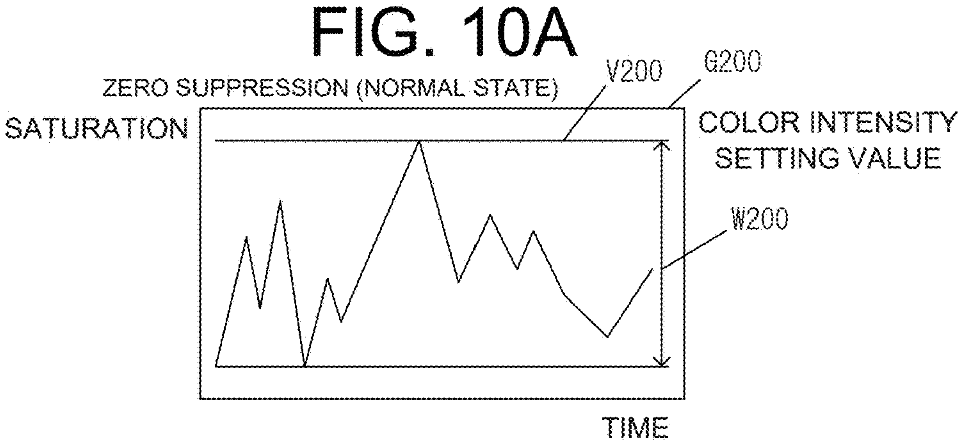
FIGS. 10A to 10D are each a diagram illustrating an operation example according to the second embodiment.

FIG. 10A is a diagram showing a graph G200 of variations in saturation in a case where the level of the suppression effect is set to zero suppression, showing temporal changes in saturation with saturation on the vertical axis and time on the horizontal axis. The controller 100 sets, for example, a color intensity (saturation) setting value V200. The color intensity setting value V200 as used herein refers to, for example, a setting value schematically representing the saturation. For example, the color intensity setting value V200 may schematically represent the saturation in the HSV color space. The controller 100 outputs the video by varying the saturation of the video within a variation range W200 having the color intensity setting value V200 as its maximum value.

Figure 10B:
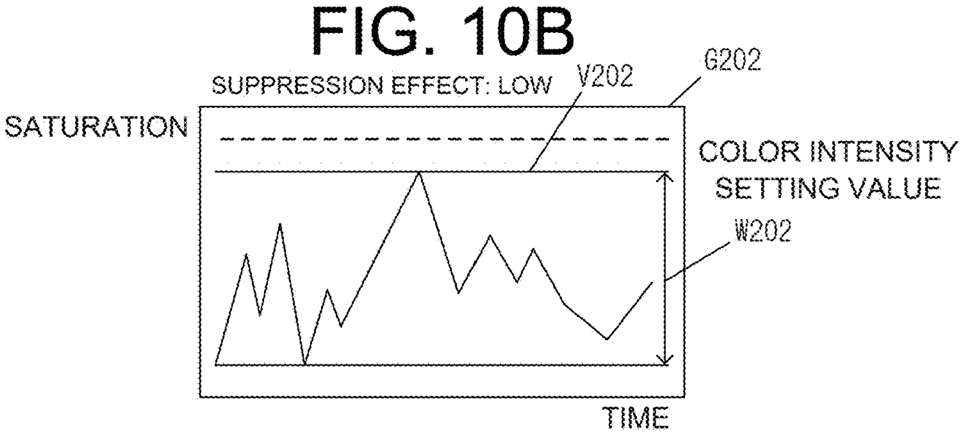

FIG. 10B is a diagram showing a graph G202 of variations in saturation in a case of a low suppression effect where the level of the suppression effect has been increased by one level from that in FIG. 10A. The controller 100 sets, for example, a color intensity setting value V202 to a lower value than the color intensity setting value V200 in FIG. 10A based on the ratio of the variation range scaling factor. The controller 100 outputs the video by varying the saturation of the video within a variation range W202 having the color intensity setting value V202 as its maximum value (for example, displays the video by suppressing variations in saturation of the video).

Figure 10C:
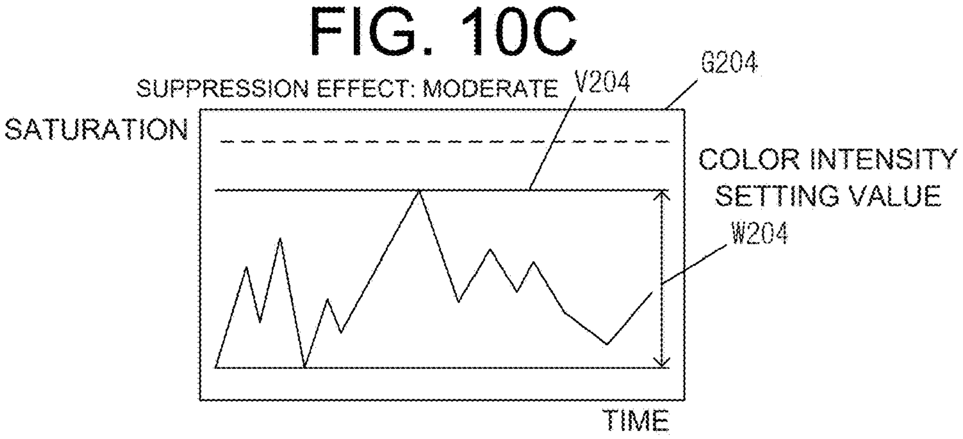

FIG. 10C is a diagram showing a graph G204 of variations in saturation in a case of a moderate suppression effect where the level of the suppression effect has been increased by one level from that in FIG. 10B. The controller 100 sets, for example, a color intensity setting value V204 to a lower value than the color intensity setting value V202 in FIG. 10B based on the ratio of the variation range scaling factor. The controller 100 outputs the video by varying the saturation of the video within a variation range W204 having the color intensity setting value V204 as its maximum value.

Figure 10D:
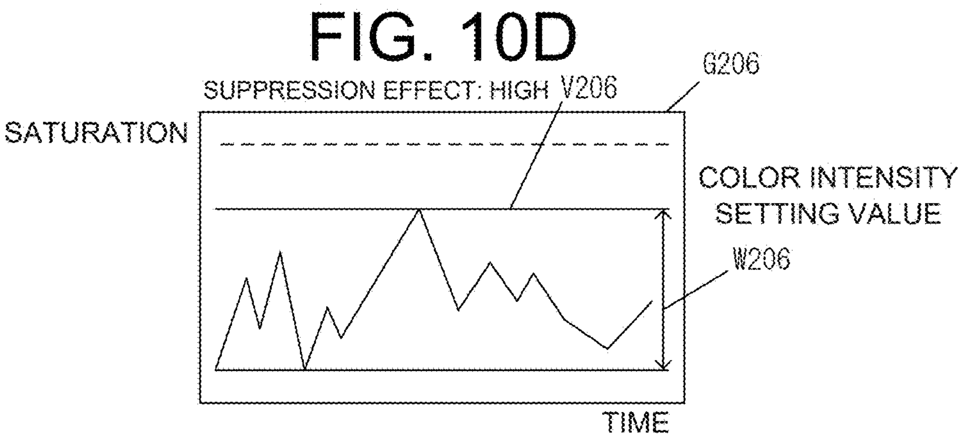

FIG. 10D is a diagram showing a graph G206 of variations in saturation in a case of a high suppression effect where the level of the suppression effect has been increased by one level from that in FIG. 10C. The controller 100 sets, for example, a color intensity setting value V206 to a lower value than the color intensity setting value V204 in FIG. 10C based on the ratio of the variation range scaling factor. The controller 100 outputs the video by varying the saturation of the video within a variation range W206 having the color intensity setting value V206 as its maximum value, restricting the variation range of the saturation to the maximum extent.

It should be noted that as in the case of the first embodiment, the controller 100 of the present embodiment restricts the variation range of the luminance of the video as shown in FIGS. 7A to 7D as well as the variation range of the saturation of the video to output the video.

Figure 11A:
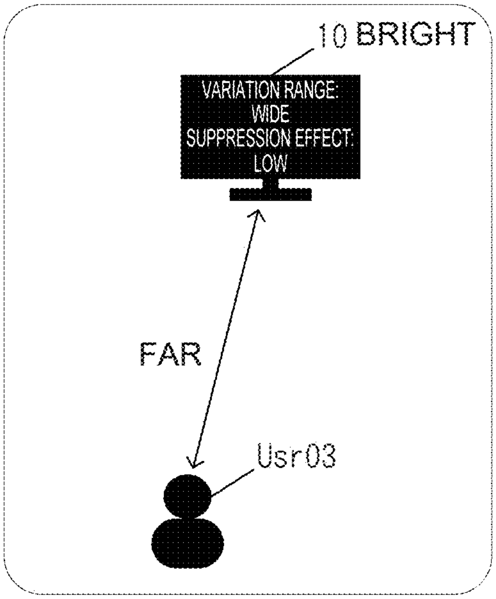
FIGS. 11A to 11D are each a diagram illustrating an operation example according to the second embodiment.

FIGS. 11A to 11D are each a diagram schematically illustrating conditions surrounding users viewing videos displayed on the display apparatus 10 and results of the display apparatus 10 applying the processing shown in FIG. 9. In FIG. 11A, a user Usr03 is viewing a video at a position far from the display apparatus 10 in a bright environment. The controller 100 determines that the user Usr03 is viewing a video at a position far from the display apparatus 10 and that the user Usr03 is in a bright environment. The controller 100 sets the suppression effect to a low level and sets wide variation ranges for the luminance and the saturation of the video as shown in FIG. 7B and FIG. 10B, for example.

Figure 11B:
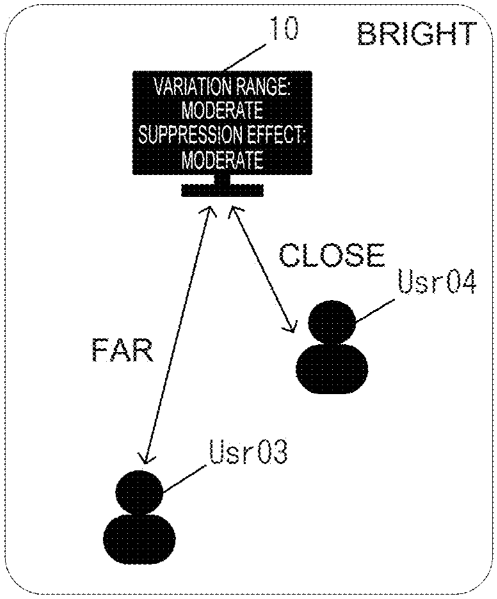

In FIG. 11B, the user Usr03 is viewing a video at a position far from the display apparatus 10 and a user Usr04 is viewing the video at a position close to the display apparatus 10. In FIG. 11B, the users are in a bright environment. The controller 100 determines the viewing distance of the user Usr03 and the viewing distance of the user Usr04. Next, the controller 100 determines the illuminance and the viewing distance based on the viewing distance of the user Usr04 who is viewing the video at a closer position to the display apparatus 10 than the user Usr03. The controller 100 determines that the user Usr04 is viewing a video at a position close to the display apparatus 10 and that the user Usr04 is in a bright environment. The controller 100 sets the suppression effect to a moderate level and sets moderate variation ranges for the luminance and the saturation of the video as shown in FIG. 7C and FIG. 10C, for example.

Figure 11C:
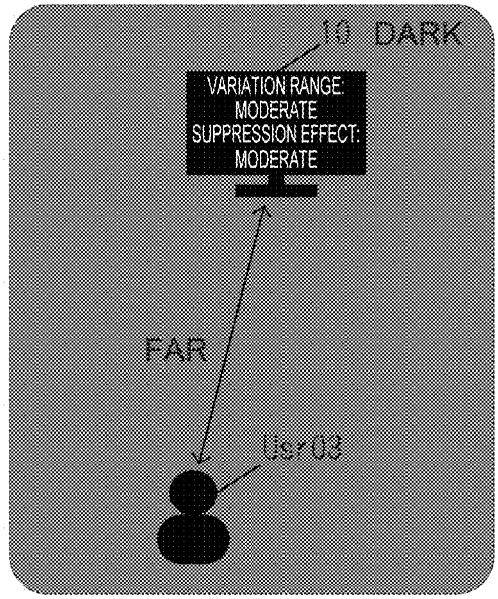

In FIG. 11C, the user Usr03 is viewing a video at a position far from the display apparatus 10 in a dark environment. The controller 100 determines that the user Usr03 is viewing a video at a position far from the display apparatus 10 and that the user Usr03 is in a dark environment. The controller 100 sets moderate variation ranges for the luminance and the saturation of the video as shown in FIG. 7C and FIG. 10C, for example.

Figure 11D:
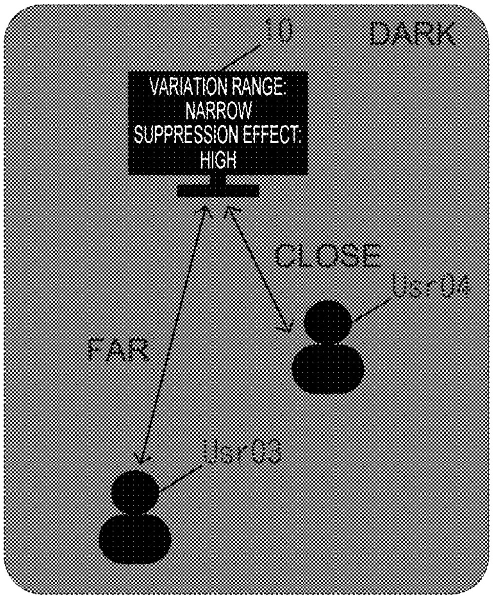

In FIG. 11D, the user Usr03 is viewing a video at a position far from the display apparatus 10 and the user Usr04 is viewing the video at a position close to the display apparatus 10. In FIG. 11D, the users are in a dark environment. As in the case of FIG. 11B, the controller 100 determines the illuminance and the viewing distance based on the viewing distance of the user Usr04 who is viewing the video at a closer position to the display apparatus 10 than the user Usr03. The controller 100 determines that the user Usr04 is viewing a video at a position close to the display apparatus 10 and that the user Usr04 is in a dark environment. The controller 100 sets the suppression effect to a high level and sets narrow variation ranges for the luminance and the saturation of the video as shown in FIG. 7D and FIG. 10D, for example.

As described above, in response to externally inputted signals such as broadcast programs, Video On Demand (VOD), or other content, the display apparatus according to the present embodiment can display videos by restricting the variation ranges of the luminance and the saturation based on external factors.

2.3. Advantageous Effects

As described above, the controller 100 restricts the luminance and the saturation of the video. Users can view the video displayed by restricting the saturation in addition to the luminance. The controller 100 determines the viewing distance of a user who is viewing the video at a position closest to the display apparatus 10, making it possible to achieve a display apparatus that allows a plurality of users to view videos without concern for adverse physical reactions.

3. Third Embodiment

The following describes a third embodiment. According to the third embodiment, the controller 100 controls lighting connected to the display apparatus 10 in addition to restricting the variation range of the luminance when a user is viewing content displayed on the display apparatus 10.

Description of elements of the third embodiment that have the same hardware or software configuration as those of the first embodiment will be omitted, and thus description of the third embodiment will focus on differences from the first embodiment.

3.1. Overall System

Figure 12:
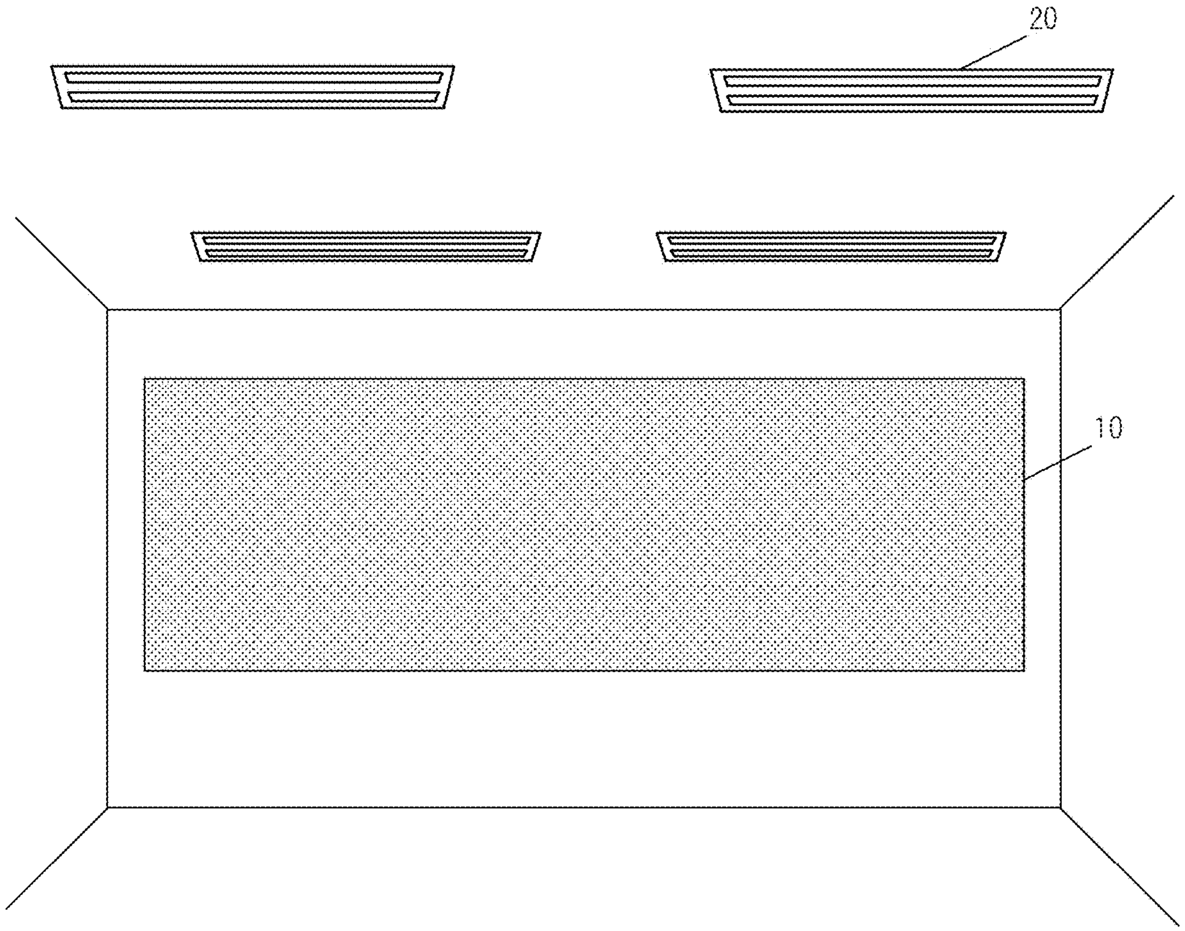
FIG. 12 is a diagram illustrating an overview of a system according to a third embodiment.

FIG. 12 is a diagram illustrating an overview of a system 1 including the display apparatus 10 and lighting apparatuses 20.

Each lighting apparatus 20 is a general lighting apparatus using an LED element or a fluorescent lamp, and has, for example, at least a controller, a storage (storage, ROM, RAM), a light source, and a communicator.

The lighting apparatus 20 may include, for example, a dimming function and sensors such as a human presence sensor, an illuminance sensor, and a depth sensor. It should be noted that the lighting apparatus 20 may be, for example, connected to the display apparatus 10 using a signal line, infrared communication, or a network (NW). Furthermore, the system 1 may include one or more lighting apparatuses 20.

3.2. Software Configuration

Figures 13, 14:
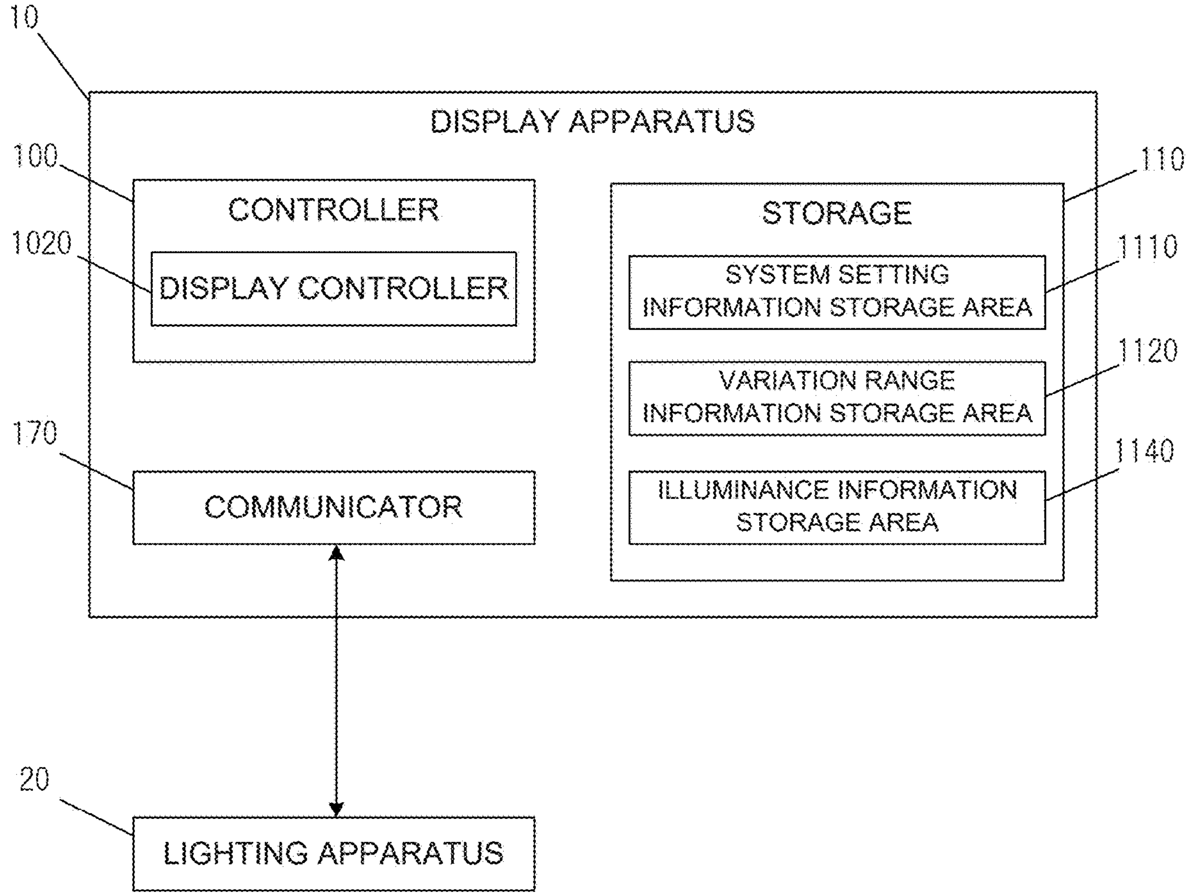
FIG. 13 is a diagram illustrating a software configuration of a display apparatus according to the third embodiment.
FIG. 14 is a diagram for describing an example of illuminance information according to the third embodiment.

The following describes a main software configuration of the system 1 with reference to FIG. 13. In the storage 110, an illuminance information storage area 1140 for storing illuminance information is reserved. The illuminance information refers to, for example, information related to restriction of the brightness (illuminance) of the lighting apparatus 20.

The following describes an example of the illuminance information stored in the illuminance information storage area 1140 with reference to FIG. 14. The illuminance information contains levels of suppression effect (for example, "3") and illuminance setting values (for example, "100"). As the illuminance setting values, for example, the illuminance of the lighting apparatus 20, the brightness level of the lighting apparatus 20, or the input power to the light source corresponding to the value of the suppression effect may be stored. In a case where the system 1 includes a plurality of lighting apparatuses 20, for example, the illuminance setting values may be stored for each of the lighting apparatuses.

3.3. Flow of Processing

Figure 15:
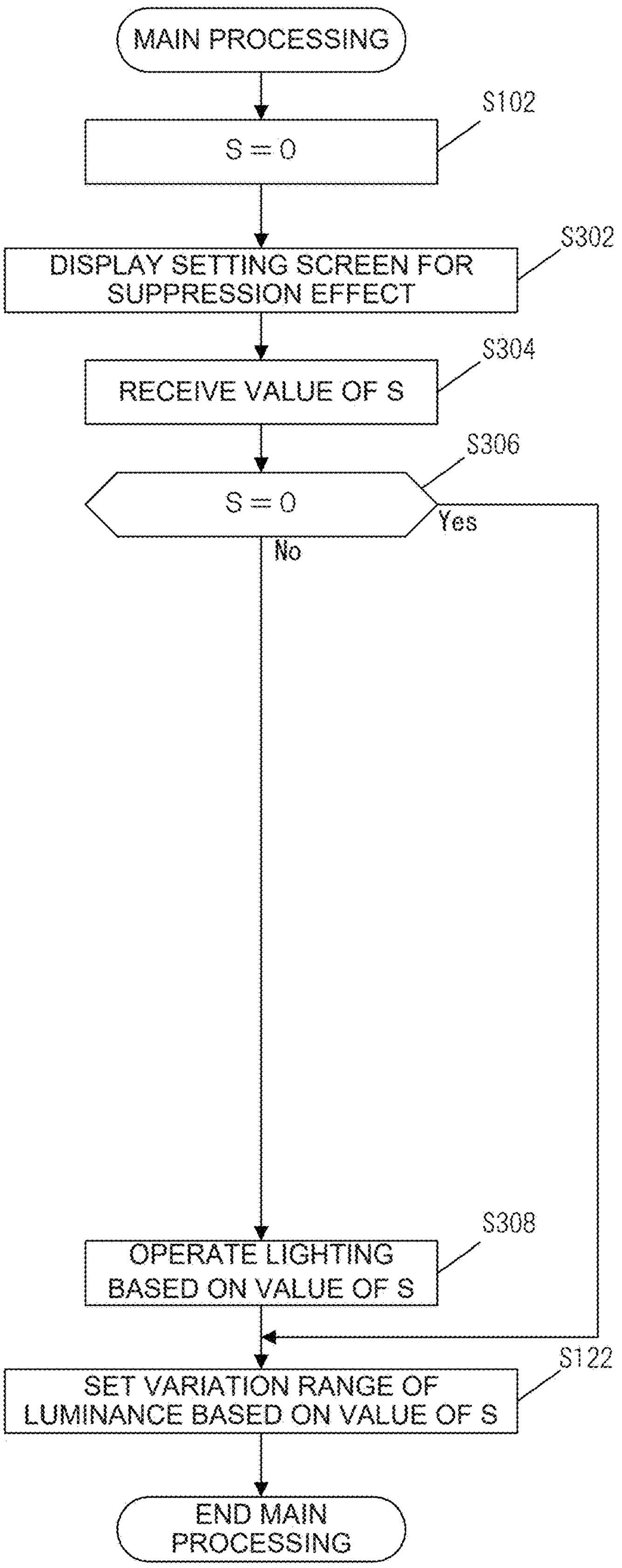
FIG. 15 is a diagram for describing a flow of processing according to the third embodiment.

FIG. 15 is a diagram for describing a flow of processing according to the present embodiment. FIG. 15 replaces FIG. 9 of the first embodiment. S302 to S308 are executed between S102 shown in FIGS. 9 and S122.

The controller 100 displays, for example, a display screen that allows the user to change the level of the suppression effect on the display 150 as a setting screen (S302). Next, the controller 100 receives, for example, input of the level of the suppression effect on the setting screen and sets the suppression effect to the received level (S304). Next, the controller 100 determines whether or not the level of the suppression effect is zero suppression (S=0) (S306). Upon determining that the level of the suppression effect is zero suppression, the controller 100 applies a variation range scaling factor corresponding to the level of the suppression effect, zero suppression, based on the variation range information, and thus sets the variation range of the luminance (Yes in S306→S122).

Upon determining that the level of the suppression effect is not zero suppression, for example, the controller 100 operates the lighting apparatus 20 to adjust the brightness of the lighting apparatus 20 based on the level of the suppression effect and the illuminance information by connecting to the lighting apparatus 20 via the communicator 170, for example (No in S306→S308).

3.4. Operation Example

Figure 16A:
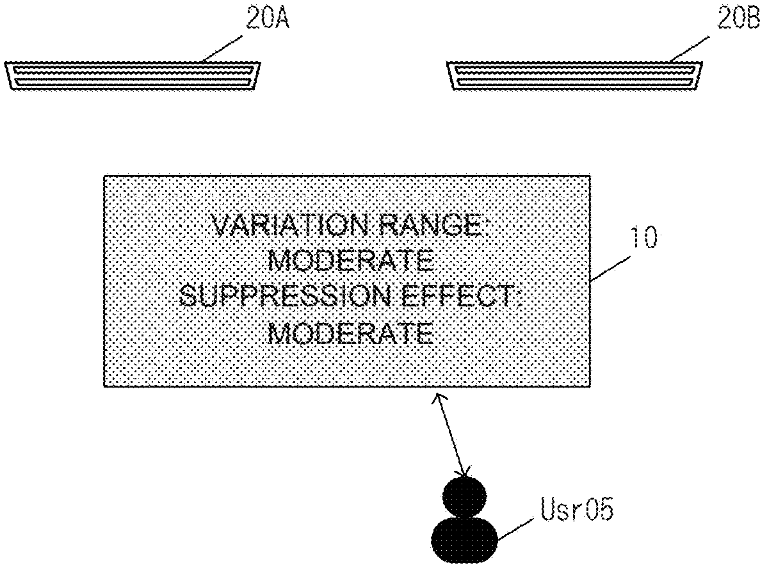
FIGS. 16A and 16B are each a diagram illustrating an operation example according to the third embodiment.
Figure 16B:
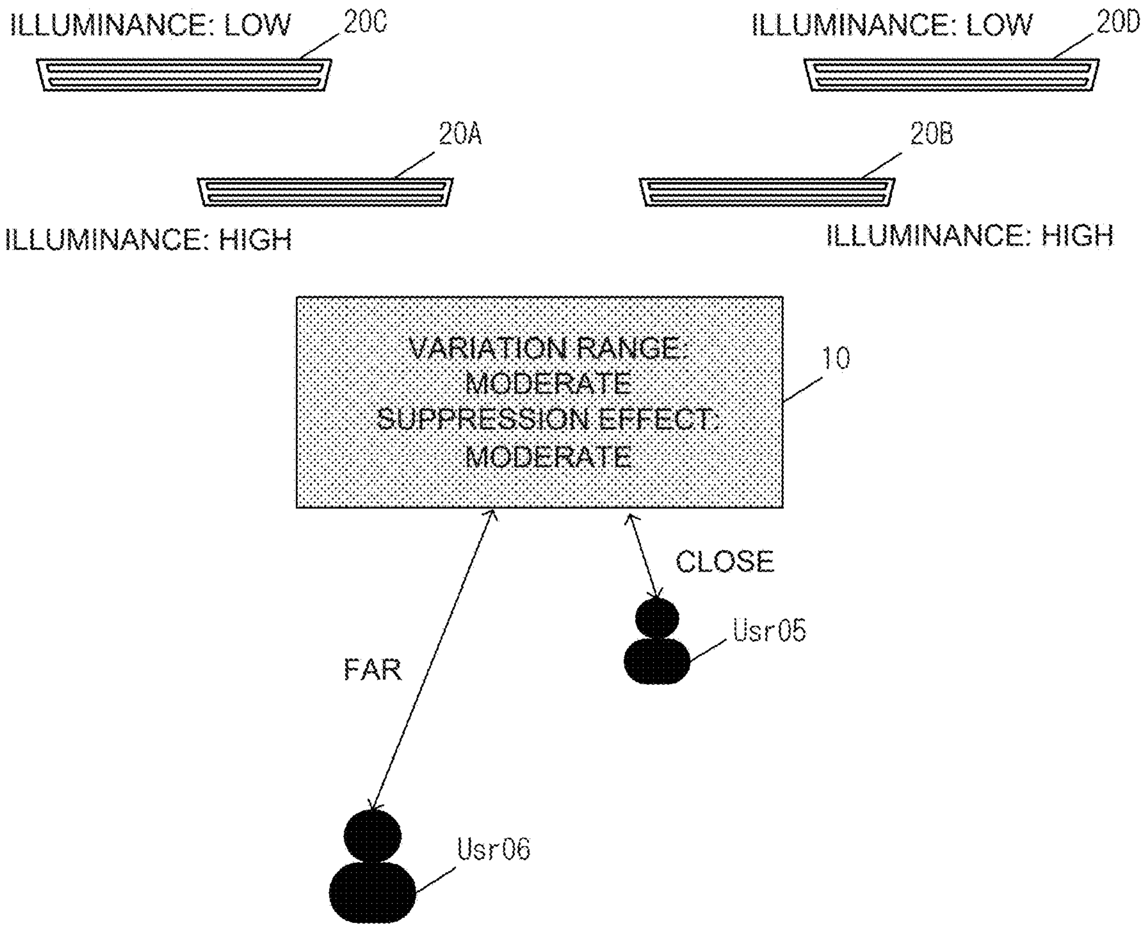

FIGS. 16A and 16B are each a diagram schematically illustrating conditions surrounding users viewing videos displayed on the display apparatus 10 or results of the display apparatus 10 applying the processing shown in FIG. 15 based on the conditions surrounding each user.

In FIG. 16A, the display apparatus 10, a lighting apparatus 20A, and a lighting apparatus 20B are installed, and a user Usr05 is viewing a video displayed on the display apparatus 10. Suppose that the user Usr05 operates the display apparatus 10 and sets, for example, the suppression effect to a moderate level. The controller 100 operates, for example, the lighting apparatus 20A and the lighting apparatus 20B to adjust the brightness of the lighting apparatus 20A and the lighting apparatus 20B in accordance with the suppression effect and the illuminance information in such a manner as to set the brightness (illuminance) to a higher level if the level of the suppression effect is higher and set the brightness (illuminance) to a lower level if the level of the suppression effect is lower. Finally, the controller 100 restricts the variation range of the luminance of the video being displayed on the display 150 of the display apparatus 10 according to the set suppression effect.

In FIG. 16B, the display apparatus 10, a lighting apparatus 20A, a lighting apparatus 20B, a lighting apparatus 20C, and a lighting apparatus 20D are installed, and the user Usr05 is viewing a video displayed on the display apparatus 10 at a position close to the display apparatus 10 and a user Usr06 is viewing the video displayed on the display apparatus 10 at a position far from the display apparatus 10. The lighting apparatuses 20A and 20B are located nearby the display apparatus 10, and the lighting apparatuses 20C and 20D are located distant from the display apparatus 10. Suppose that the user Usr05 operates the display apparatus 10 and sets, for example, the suppression effect to a moderate level. The controller 100 operates, for example, the nearby lighting apparatus 20A and the nearby lighting apparatus 20B to adjust the brightness (illuminance) of the nearby lighting apparatus 20A and the nearby lighting apparatus 20B to a higher level, and operates the distant lighting apparatus 20C and the distant lighting apparatus 20D to adjust the brightness (illuminance) of the distant lighting apparatus 20C and the distant lighting apparatus 20D to a lower level in accordance with the suppression effect and the illuminance information. Finally, the controller 100 restricts the variation range of the luminance of the video being displayed on the display 150 of the display apparatus 10 according to the set suppression effect.

The display apparatus 10 allows users to view videos with a medium suppression effect regardless of viewing position by operating each lighting apparatus 20.

In the present embodiment, the controller 100 restricts the variation range of the luminance as well as the surrounding brightness. However, for example, the controller 100 may only change the surrounding brightness (illuminance of each lighting apparatus 20) without restricting the variation ranges of the luminance and the saturation of the video.

Furthermore, in a configuration including the image determiner 1010, for example, the controller 100 may determine the viewing distance of the user and adjust the brightness (illuminance) of each lighting apparatus 20 according to the viewing distance or only adjust the brightness (illuminance) of the lighting apparatus 20 closest to the user.

For another example, the controller 100 may register, in the display apparatus 10, the face and physical characteristics of a user prone to photosensitive seizures, and determine the user for which such characteristics have been registered (registered user) using the image determiner 1010. The controller 100 can determine the viewing position of the registered user and only adjust the brightness of the lighting apparatus 20 closest to the registered user to a higher level among the lighting apparatuses 20. On the other hand, for example, the controller 100 may only adjust the brightness of the lighting apparatus 20 closest to the viewing position of a user who is less prone to photosensitive seizures to a lower level among the lighting apparatuses 20.

3.5. Advantageous Effects

As described above, the controller 100 operates each lighting apparatus 20 according to the suppression effect, so that users can enjoy viewing videos at any position and brightness they like.

4. Fourth Embodiment

The following describes a fourth embodiment. According to the fourth embodiment, the controller 100 restricts the luminance according to the genre (broadcast program type) of content (for example, broadcast program) or information indicated by on-screen text being displayed on the display apparatus 10.

Description of elements of the fourth embodiment that have the same hardware or software configuration as those of the first embodiment will be omitted, and thus description of the fourth embodiment will focus on differences from the first embodiment.

4.1. Software Configuration

Figures 17, 18:
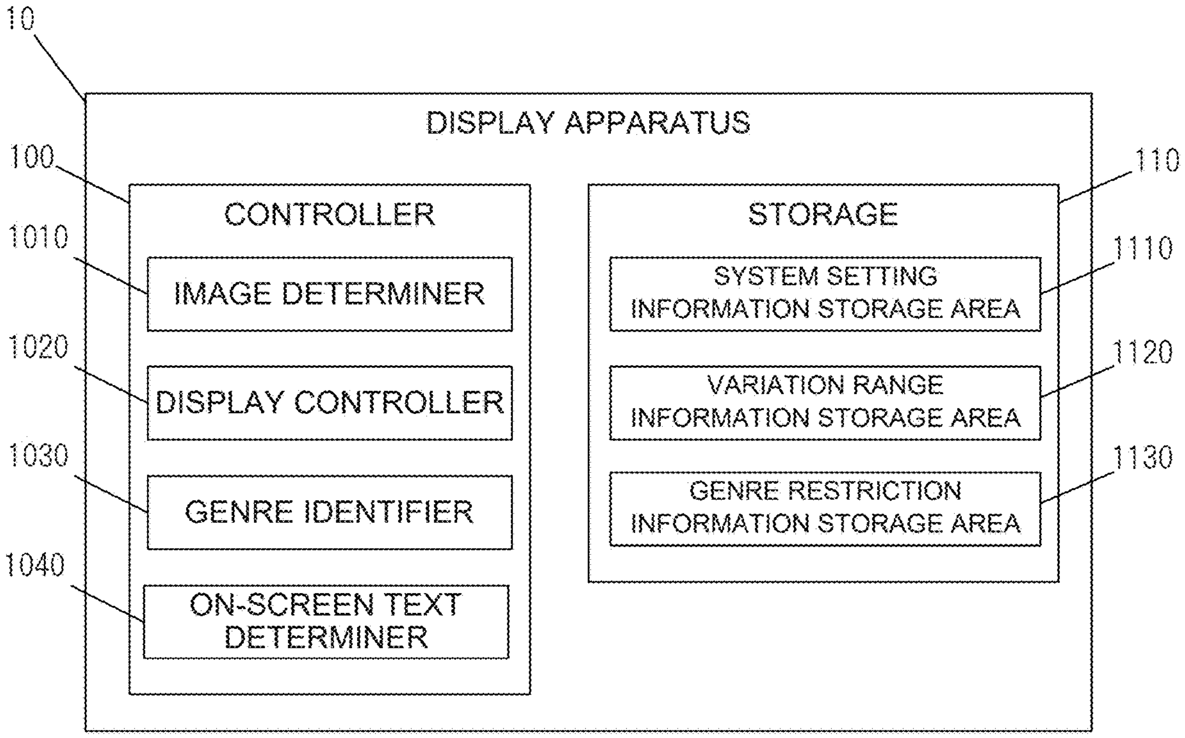
FIG. 17 is a diagram illustrating a software configuration of a display apparatus according to a fourth embodiment.
FIG. 18 is a diagram for describing an example of genre restriction information according to the fourth embodiment.

The following describes a software configuration with reference to FIG. 17. It should be noted that FIG. 17 shows main elements of the software configuration that are necessary for the present embodiment, and other elements of the software configuration are not shown.

The controller 100 can implement a genre identifier 1030 and an on-screen text determiner 1040 by reading and executing a program stored in the storage (the storage 110 or the ROM 120).

The genre identifier 1030 identifies, for example, the genre of a broadcast program being viewed based on broadcast program information obtained from the broadcast controller 140. The broadcast program information refers to, for example, information that is contained in electronic broadcast program guide (EPG) retrieved by the broadcast controller 140 from a broadcast signal and that includes broadcast program title, genre, and broadcast program description.

The on-screen text determiner 1040 determines whether or not specific on-screen text, for example, information pertaining to on-screen text such as a warning to users viewing a video (on-screen text information), has been displayed in a broadcast program being viewed from on-screen text-related data obtained from the on-screen text decoder 440.

In the storage 110, a genre restriction information storage area 1130 for storing genre restriction information is reserved. Here, an example of the genre restriction information stored in the genre restriction information storage area 1130 will be described with reference to FIG. 18. The genre restriction information contains levels of suppression effect (for example, "3") and genre information (for example, "Animation, special effects, live concerts/concerts, ") contained in the broadcast program information. Regarding the genre information, a plurality of genres may be stored for a single level of suppression effect.

4.2. Flow of Processing

Figure 19:
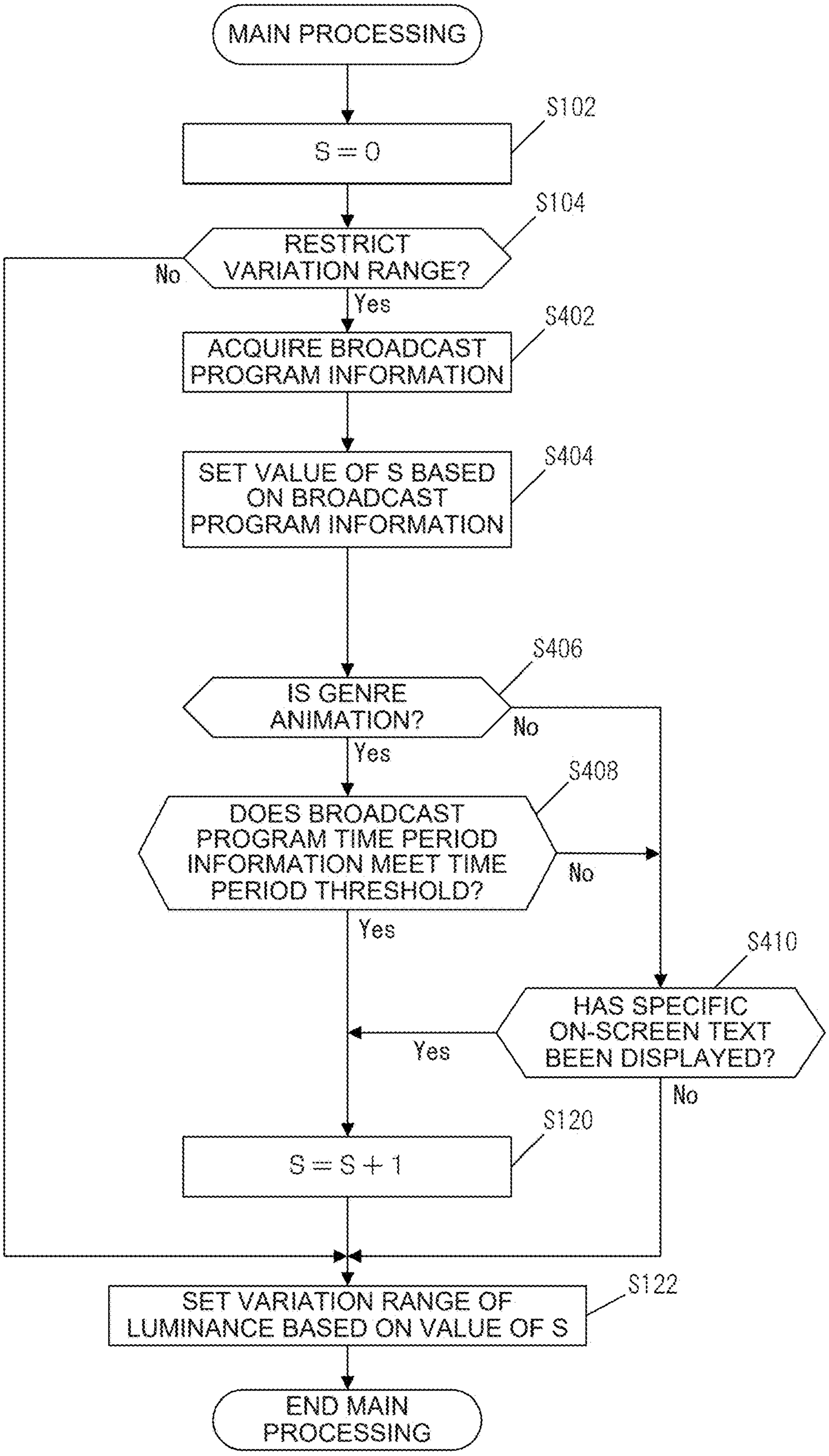
FIG. 19 is a diagram for describing a flow of processing according to the fourth embodiment.

FIG. 19 is a diagram for describing a flow of processing according to the present embodiment. FIG. 19 replaces FIG. 9 of the first embodiment. S402 to S410 are executed between S102 and S120 shown in FIG. 9.

The controller 100 acquires broadcast program information on a broadcast program being viewed by a user from, for example, electronic broadcast program guide (S402). Next, the controller 100 sets the level of the suppression effect based on the acquired broadcast program information (S404). For example, the controller 100 sets the level of the suppression effect by comparing the broadcast program information acquired through the genre identifier 1030 with the genre restriction information and determining the level of the suppression effect corresponding to the genre contained in the acquired broadcast program information.

Next, the controller 100 determines whether or not the genre in the acquired broadcast program information is animation (S406). Upon determining that the genre in the acquired broadcast program information is animation, the controller 100 determines whether or not broadcast program time period information meets a time period threshold (Yes in S406→S408).

The broadcast program time period information may refer to, for example, information indicating the title of the broadcast program, the production year of the broadcast program as recorded in the broadcast program description, and information indicating a rebroadcast. For example, the controller 100 may determine that the broadcast program time period information meets the time period threshold if the broadcast program was produced in a year before a specific time period. In this example, the specific time period may be, for example, before the year 2000, or preferably before the 1990s.

Upon determining that the genre in the acquired broadcast program information is not animation (No in S406) or that the broadcast program time period information does not meet the time period threshold (No in S408), the controller 100 determines whether or not specific on-screen text has been displayed using the on-screen text determiner 1040 (S410).

Upon determining that the broadcast program time period information meets the time period threshold (Yes in S408) or that the specific on-screen text has been displayed (Yes in S410), the controller 100 increases the level of suppression effect by one level (S120). Upon determining that the specific on-screen text has not been displayed, the controller 100 sets the variation range of the luminance based on the level of the suppression effect (No in S410→S122).

4.3. Operation Example

Figure 20A:
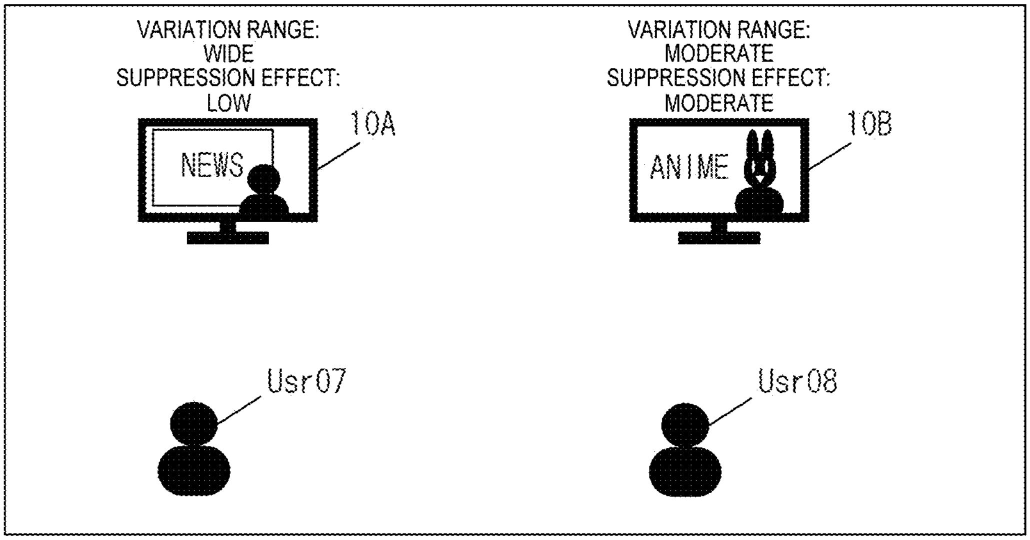
FIGS. 20A and 20B are each a diagram illustrating an operation example according to the fourth embodiment.
Figure 20B:
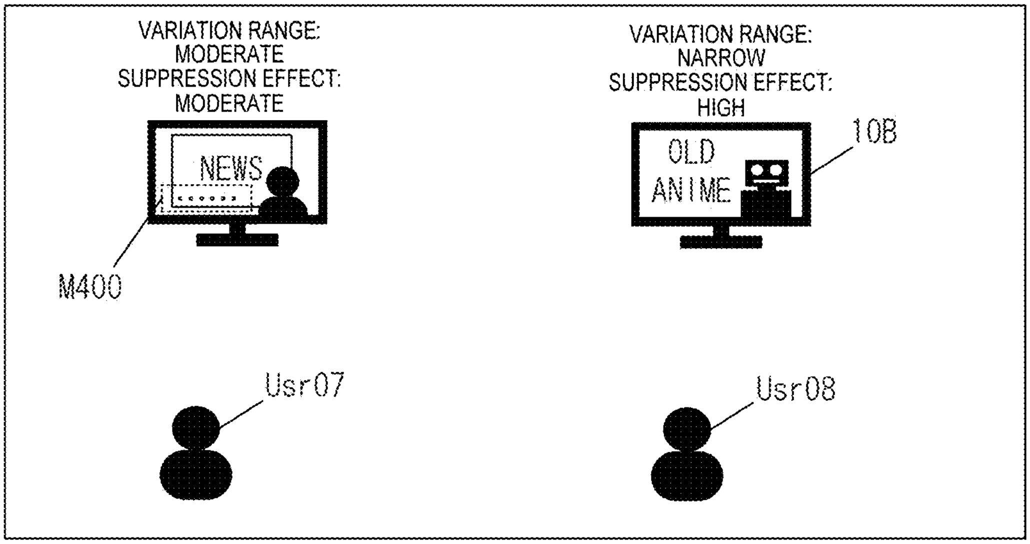

FIGS. 20A and 20B are each a diagram schematically illustrating conditions surrounding users respectively viewing broadcast programs from different genres displayed on the display apparatus 10A and the display apparatus 10B, and results of the display apparatus 10A and the display apparatus 10B applying the processing shown in FIG. 19.

In FIG. 20A, the display apparatus 10A is displaying a news program, and a user Usr07 is viewing this news program. The display apparatus 10B is displaying an animated program, and a user Usr08 is viewing this animated program. The display apparatus 10A sets the suppression effect to a low level corresponding to the genre of the news program based on the broadcast program information and sets a wide variation range for the luminance to display the video. By contrast, the display apparatus 10B sets the suppression effect to a moderate level corresponding to the genre of the animated program based on the broadcast program information and sets a moderate variation range for the luminance to display the video.

In FIG. 20B, the display apparatus 10A is displaying a news program, and the user Usr07 is viewing this news program. In this example, specific on-screen text, which is a warning to users viewing the video, is displayed on the display apparatus 10A. The display apparatus 10B is displaying an animated program from an earlier time period, and the user Usr08 is viewing this animated program. The display apparatus 10A sets the suppression effect to a low level corresponding to the genre of the news program based on the broadcast program information. Next, the display apparatus 10A determines that the specific on-screen text has been displayed and increases the level of the suppression effect by one level to set the suppression effect to a moderate level. The display apparatus 10A sets a moderate variation range for the luminance to display the video.

By contrast, the display apparatus 10B sets the suppression effect to a moderate level corresponding to the genre of the animated program based on the broadcast program information. Next, the display apparatus 10B determines the time period when the broadcast program was produced and increases the level of the suppression effect by one level to set the suppression effect to a high level. The display apparatus 10B sets a narrow variation range for the luminance to display the video.

4.4. Advantageous Effects

As described above, the controller 100 can determine the suppression effect according to the broadcast program information, and can restrict the variation range of the luminance according to the video displayed on the display 150. This allows users (viewers) to enjoy better quality content in their favorite viewing environment without worrying about adverse physical reactions.

5. Fifth Embodiment

The following describes a fifth embodiment. According to the fifth embodiment, the display apparatus 10 acquires external factors using a sensor instead of the camera.

Description of elements of the fifth embodiment that have the same hardware or software configuration as those of the first embodiment will be omitted, and thus description of the fifth embodiment will focus on differences from the first embodiment.

5.1. Hardware Configuration

Figure 21:
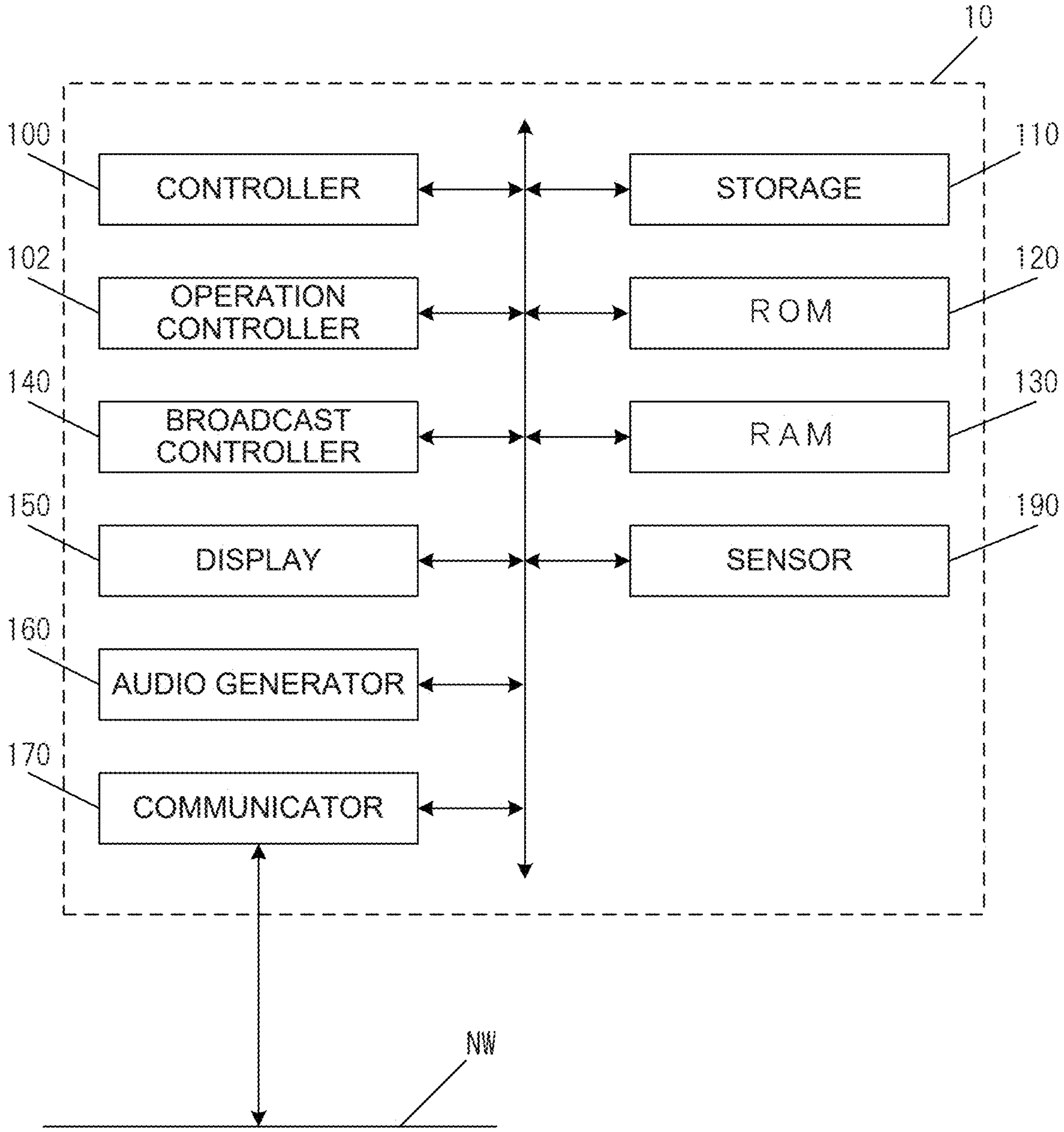
FIG. 21 is a diagram illustrating a hardware configuration of a display apparatus according to a fifth embodiment.

The following describes a hardware configuration with reference to FIG. 21. FIG. 21 is a diagram illustrating an example of the display apparatus 10. The display apparatus 10 has a sensor 190 instead of the imager 180.

The sensor 190 is a sensor device that senses conditions in the surroundings of an area where the display apparatus 10 is installed. The sensor 190 may include, for example, a plurality of sensor devices such as an illuminance sensor, a distance sensor, a color temperature sensor, a human presence sensor, and a depth sensor.

In the present embodiment, the sensor 190 includes a distance sensor and an illuminance sensor. However, the sensor 190 may include a different combination. For example, the sensor 190 may include a color temperature sensor instead of the distance sensor. It should be noted that the illuminance sensor may acquire the illuminance and change in illuminance (light flicker) as external factors.

As the distance sensor, the sensor 190 may include, for example, an ultrasonic distance sensor, an infrared distance sensor, a millimeter wave distance sensor, or a laser distance sensor. As the illuminance sensor, the sensor 190 may include, for example, a phototransistor-based illuminance sensor or a photodiode-based illuminance sensor.

The sensor 190 outputs various types of data such as the illuminance, the viewing distance of the user, and the color temperature acquired by the respective sensors as external factors.

5.2. Flow of Processing

Figure 22:
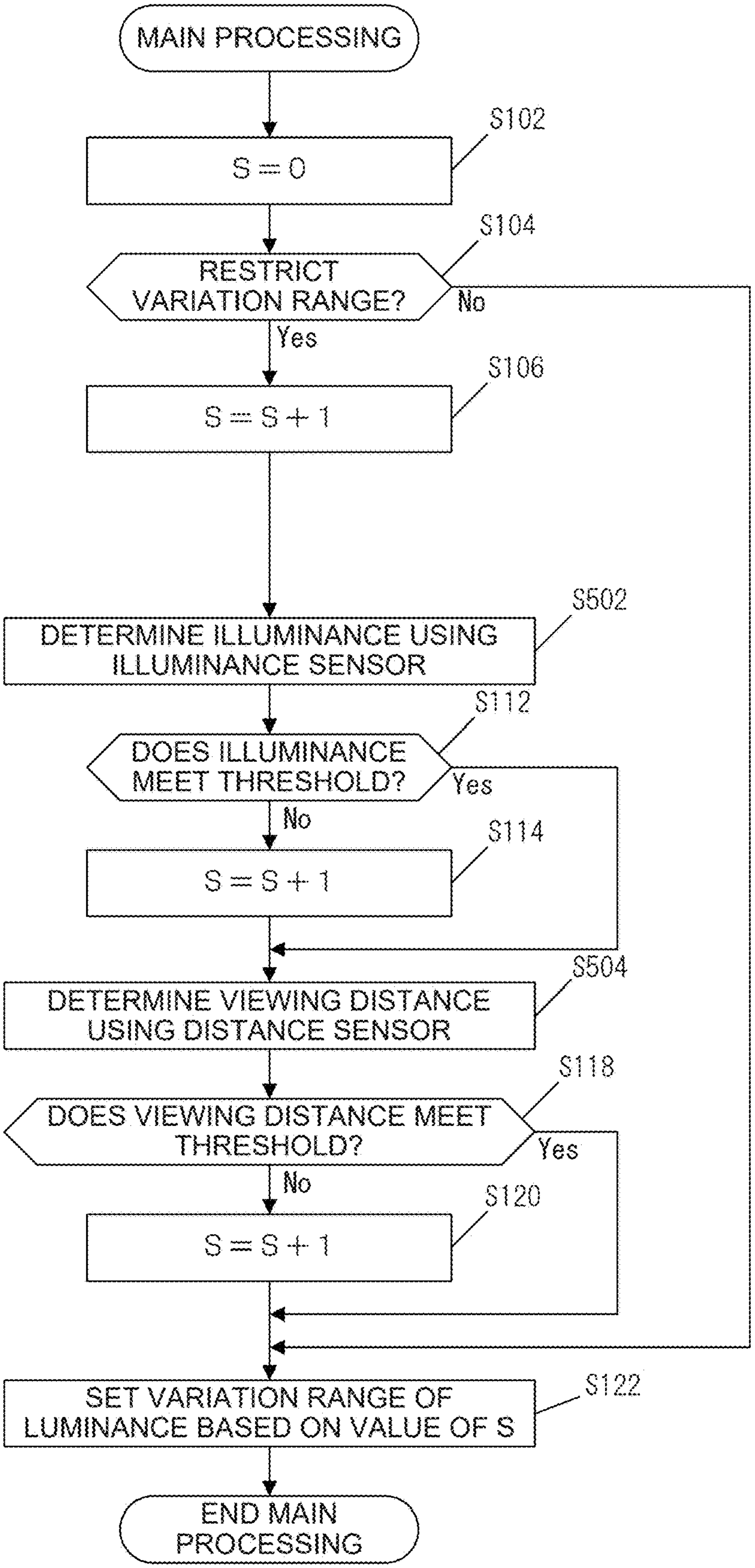
FIG. 22 is a diagram for describing a flow of processing according to the fifth embodiment.

FIG. 22 is a diagram for describing a flow of processing according to the present embodiment. FIG. 22 replaces FIG. 9 of the first embodiment. S502 is executed instead of S108 and S110 shown in FIG. 9, and S504 is executed instead of S116.

The controller 100 determines the illuminance using the illuminance sensor in the sensor 190 (S502). The controller 100 also determines the viewing distance of the user using the distance sensor in the sensor 190 (S504).

It should be noted that the operation flow described above is merely an example, and the controller 100 may perform some different processes. For example, the controller 100 may determine the color temperature using the color temperature sensor in the sensor 190 instead of performing the process in S504 and determine whether or not the color temperature meets a threshold instead of performing the process in S118. For example, the controller 100 may determine that the color temperature meets the threshold if the color temperature of the viewing environment of the user is higher than the temperature of neutral white (4500 K).

5.3. Operation Example

According to the present embodiment, the display apparatus 10 can restrict the variation range of the luminance of the content that is displayed on the display 150 based on external factors, without performing the image determination using image data. Furthermore, the display apparatus 10 can obtain, for example, change in the illuminance that cannot be obtained from image data, such as light flicker, as an external factor.

6. Modification Example

The present disclosure is not limited to the embodiments described above, and various modifications may be made thereto.

That is, the technical scope of the present disclosure also includes embodiments that may be obtained by combining technical measures that are modified as appropriate without departing from the gist of the present disclosure.

Each of the foregoing embodiments is described as an example of a display apparatus. However, the present disclosure is applicable to other apparatuses that can serve as a display apparatus. For example, the present disclosure may be applied to an information processing device that can serve as a display apparatus, such as a smartphone or a tablet computer.

Furthermore, although the foregoing embodiments are individually described for convenience of explanation, the embodiments can be combined to the extent possible to be implemented. Furthermore, the applicant intends to acquire rights to any of the techniques described in the specification through amendments, divisional applications, or the like.

The program(s) that operates on each device (apparatus) in the foregoing embodiments is a program that controls the CPU or the like (program that causes a computer to function) so as to implement the functions according to the foregoing embodiments. Information that is handled by each device (apparatus) is temporarily accumulated in a temporary storage device (for example, RAM)) during processing, is then stored in various storage devices such as ROM and an HDD, and is read, corrected, and written by the CPU as needed.

A recording medium that records thereon a program(s) as referred to herein may be, for example, any of a semiconductor medium (for example, ROM and a non-volatile memory card), an optical recording medium/magneto-optical recording medium (for example, Digital Versatile Disc (DVD)), a Compact Disc (CD), and a Blu-ray (registered trademark) Disc (BD)), and a magnetic recording medium (for example, a magnetic tape and a flexible disk).

For market distribution, the program may be stored and distributed in a portable recording medium or transferred to a server computer connected via a network such as the Internet. In this case, a storage device of the server computer is obviously included in the present disclosure.

Furthermore, the data described above may be stored in an external device instead of being stored in the apparatus and may be retrieved as appropriate. For example, the data may be stored in a Network Attached Storage (NAS) or on the cloud.

It should be noted that the scope of the present disclosure is not limited to the configurations explicitly described in the present specification, and includes any combination of the techniques disclosed in the present specification. Configurations of the present disclosure for which patent protection is sought are set forth in the appended claims. However, the claims are not intended to exclude any other configurations from the technical scope thereof on the grounds that they are not set forth in the claims.

In the present specification, a description of a configuration including the term "in a/the case of/where", "if", or "when" is provided as an example, and is not intended to limit the configuration to the conditions or situations described. Such a description is intended to encompass and seek patent protection for configurations applicable under conditions or situations other than those explicitly stated, to the extent that such configurations would be apparent to those skilled in the art.

Furthermore, in the present specification, a description of processes or data flows including their order is not intended to limit the processes or data flows to the explicitly stated order. For example, such a description is intended to encompass and seek patent protection for configurations obtained by removing some of the processes or rearranging the order of the processes.

Furthermore, the functions disclosed in the foregoing embodiments are described as being performed by respective devices, but they may also be implemented by a single device or by using an external server.

Furthermore, the functional blocks or various features of the device/apparatus used in the embodiments described above may be implemented or executed as an electrical circuit, such an integrated circuit or a plurality of integrated circuits. An electrical circuit designed to implement the functions described herein may include a general-purpose processor, a digital signal processor (DSP), an application-specific integrated circuit (ASIC), a field programmable gate array (FPGA), or other programmable logic devices, discrete gates or transistor logic, discrete hardware components, or a combination of these. The general-purpose processor may be a microprocessor or a conventional processor, controller, microcontroller, or state machine. The electrical circuit described above may be configured by a digital circuit or an analog circuit. Moreover, when an integrated circuit technology that replaces the current integrated circuits emerges as a result of advances in semiconductor technology, one or more aspects of the present disclosure may also use the new integrated circuits based on such technology.

What is claimed is:

1. A display apparatus comprising:

a display;

an acquirer that acquires external factors including a viewing distance of a user; and a controller that displays, in response to an input signal, a video on the display by restricting a variation range of luminance or saturation of the video based on the acquired external factors, wherein in a case that a plurality of users is viewing the video, the controller restricts the variation range based on the viewing distance of a user closest to the display apparatus.

2. The display apparatus according to claim 1, wherein the controller assesses each of the external factors, and determines and sets a setting value for restricting the variation range based on each of the external factors.

3. The display apparatus according to claim 2, wherein the controller assesses each of the external factors using a threshold defined on a per-external factor basis, and determines the setting value based on each of the external factors.

4. The display apparatus according to claim 3, wherein the controller assesses illuminance and the viewing distance of the user as the external factors using respective thresholds, and determines the setting value based on the illuminance and the viewing distance.

5. The display apparatus according to claim 1, wherein;

the external factors further include broadcast program information and on-screen text information pertaining to the video acquired by the acquirer; and the controller determines and sets a setting value for restricting the variation range by assessing each of the external factors.

6. The display apparatus according to claim 1, wherein the controller further restricts the variation range by controlling backlight luminance.

7. The display apparatus according to claim 1, wherein the controller further restricts the variation range by controlling a luminance signal or a color difference signal.

8. The display apparatus according to claim 1, wherein:

a lighting apparatus is connected to the display apparatus; and the controller restricts brightness of the lighting apparatus.

9. A display apparatus comprising:

a display;

an acquirer that acquires external factors; and a controller that displays, in response to an input signal, a video on the display by restricting a variation range of luminance or saturation of the video based on the acquired external factors, wherein:

the controller assesses illuminance and a viewing distance as the external factors using respective thresholds defined on a per-external factor basis; and in a case that a plurality of users is viewing the video, the controller determines and sets a setting value for restricting the variation range based on the viewing distance of a user, of the plurality of users, who is closest to the display apparatus.

10. The display apparatus according to claim 9, wherein:

the external factors include broadcast program information and on-screen text information pertaining to the video acquired by the acquirer; and the controller assesses the broadcast program information and the on-screen text information, and further determines and sets the setting value based on the broadcast program information and the on-screen text information.

11. The display apparatus according to claim 9, wherein the controller further restricts the variation range by controlling backlight luminance.

12. The display apparatus according to claim 9, wherein the controller further restricts the variation range by controlling a luminance signal or a color difference signal.

13. The display apparatus according to claim 9, wherein:

a lighting apparatus is connected to the display apparatus; and the controller restricts brightness of the lighting apparatus.

14. A method for controlling a display apparatus, the method comprising:

displaying;

acquiring external factors including a viewing distance of a user; and performing a control to display, in response to an input signal, a video by restricting a variation range of luminance or saturation of the video in the displaying based on the acquired external factors, wherein in a case that a plurality of users is viewing the video, performing the control includes restricting the variation range based on the viewing distance of a user closest to the display apparatus.

15. A non-transitory computer-readable medium of a device storing one or more computer-readable instructions that, when executed by at least one processor of the device, cause the device to:

display;

acquire external factors including a viewing distance of a user; and perform a control to display, in response to an input signal, a video by restricting a variation range of luminance or saturation of the video in the displaying based on the acquired external factors, wherein in a case that a plurality of users is viewing the video, performing the control includes restricting the variation range based on the viewing distance of a user closest to the display apparatus.

* * * * *